(12) United States Patent  (10) Patent No.: US 7,710,445 B2
Amada et al.  (45) Date of Patent: *May 4, 2010

(54) LIGHT SOURCE UNIT, OPTICAL SCAN APPARATUS, AND IMAGE FORMATION APPARATUS

(75) Inventors: Taku Amada, Yamato (JP); Tomohiro Nakajima, Yokohama (JP); Yoshinori Hayashi, Kawasaki (JP); Nobuaki Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/230,248

(22) Filed: Aug. 26, 2008

(65) Prior Publication Data

US 2009/0060583 A1    Mar. 5, 2009

(30) Foreign Application Priority Data

Aug. 31, 2007  (JP)  ............................. 2007-226178
Mar. 27, 2008  (JP)  ............................. 2008-082308

(51) Int. Cl.
    *B41J 2/45* (2006.01)
(52) U.S. Cl. ..................................................... 347/238
(58) Field of Classification Search ................. 347/238, 347/237, 241, 242, 256, 257; 359/204.1
    See application file for complete search history.

(56) References Cited

U.S. PATENT DOCUMENTS 5,999,345 A   12/1999  Nakajima et al.
6,185,026 B1   2/2001  Hayashi et al.
6,198,562 B1   3/2001  Hayashi et al.
6,317,246 B1  11/2001  Hayashi et al.
6,400,391 B1   6/2002  Suhara et al.
6,410,904 B1*  6/2002  Ito et al. ................. 250/214 R
6,462,853 B2  10/2002  Hayashi
6,587,245 B2   7/2003  Hayashi
6,621,512 B2   9/2003  Nakajima et al.
6,657,765 B2  12/2003  Hayashi et al.
6,744,545 B2   6/2004  Suhara et al.
6,757,089 B2   6/2004  Hayashi
6,768,506 B2   7/2004  Hayashi et al.
6,771,296 B2   8/2004  Hayashi et al.
6,771,300 B2   8/2004  Amada et al.
6,771,407 B2   8/2004  Hayashi et al.
6,775,041 B1   8/2004  Nakajima
6,788,444 B2   9/2004  Suzuki et al.
6,803,941 B2  10/2004  Hayashi et al.
6,839,157 B2   1/2005  Ono et al.

(Continued)

FOREIGN PATENT DOCUMENTS

JP          2908652       4/1999

(Continued)

*Primary Examiner*—Hai C Pham
(74) *Attorney, Agent, or Firm*—Dickstein Shapiro LLP

(57) ABSTRACT

A light source unit is provided which includes a light source with a plurality of light emission portions two-dimensionally arranged; a substrate on which the light source is mounted; a first support portion supporting the substrate; a bias member biasing the substrate towards the first support portion; a coupling element coupling a light beam emitted from the light source; a second support portion supporting the coupling element; and a holding member holding a position of the substrate relative to the first support portion.

19 Claims, 16 Drawing Sheets

U.S. PATENT DOCUMENTS

| | | |
|---|---|---|
| 6,867,890 B2 | 3/2005 | Suzuki et al. |
| 6,870,652 B2 | 3/2005 | Suhara et al. |
| 6,903,856 B2 | 6/2005 | Hayashi |
| 6,906,739 B2 | 6/2005 | Suzuki et al. |
| 6,932,271 B2 | 8/2005 | Nakajima et al. |
| 6,934,061 B2 | 8/2005 | Ono et al. |
| 6,937,371 B2 | 8/2005 | Hayashi et al. |
| 6,956,685 B2 | 10/2005 | Hayashi |
| 6,972,883 B2 | 12/2005 | Fujii et al. |
| 6,977,762 B2 | 12/2005 | Hayashi |
| 6,987,593 B2 | 1/2006 | Hayashi et al. |
| 6,995,885 B2 | 2/2006 | Nakajima |
| 7,006,120 B2 | 2/2006 | Sakai et al. |
| 7,050,082 B2 | 5/2006 | Suzuki et al. |
| 7,050,210 B2 | 5/2006 | Atsuumi et al. |
| 7,068,296 B2 | 6/2006 | Hayashi et al. |
| 7,072,127 B2 | 7/2006 | Suhara et al. |
| 7,075,688 B2 | 7/2006 | Nakajima |
| 7,088,484 B2 | 8/2006 | Hayashi et al. |
| 7,106,483 B2 | 9/2006 | Hayashi et al. |
| 7,145,589 B2 | 12/2006 | Amada et al. |
| 7,145,705 B2 | 12/2006 | Hayashi |
| 7,154,651 B2 | 12/2006 | Atsuumi et al. |
| 7,164,516 B2 | 1/2007 | Hayashi et al. |
| 7,170,660 B2 | 1/2007 | Nakajima |
| 7,206,014 B2 | 4/2007 | Amada et al. |
| 7,221,493 B2 | 5/2007 | Fujii et al. |
| 7,233,425 B2 | 6/2007 | Hayashi |
| 7,236,281 B2 | 6/2007 | Hayashi et al. |
| 7,245,311 B2 | 7/2007 | Hayashi et al. |
| 7,253,937 B2 | 8/2007 | Ueda et al. |
| 7,271,823 B2 | 9/2007 | Izumi et al. |
| 7,271,824 B2 | 9/2007 | Omori et al. |
| 7,298,537 B2 | 11/2007 | Hayashi et al. |
| 7,315,409 B2 | 1/2008 | Hayashi |
| 7,333,254 B2 | 2/2008 | Amada et al. |
| 7,362,486 B2 | 4/2008 | Hayashi et al. |
| 7,372,604 B2 | 5/2008 | Hayashi |
| 7,397,591 B2 | 7/2008 | Hayashi et al. |
| 7,411,712 B2 | 8/2008 | Nakajima et al. |
| 7,511,868 B2 * | 3/2009 | Nakajima ............... 359/204.1 |
| 2002/0122217 A1 | 9/2002 | Nakajima |
| 2003/0053156 A1 | 3/2003 | Satoh et al. |
| 2004/0036936 A1 | 2/2004 | Nakajima et al. |
| 2005/0024479 A1 | 2/2005 | Itabashi et al. |
| 2005/0062836 A1 | 3/2005 | Nakajima |
| 2005/0105156 A1 | 5/2005 | Ono et al. |
| 2005/0179971 A1 | 8/2005 | Amada et al. |
| 2005/0185237 A1 | 8/2005 | Nakajima |
| 2005/0190420 A1 | 9/2005 | Imai et al. |
| 2006/0012844 A1 | 1/2006 | Fujii et al. |
| 2006/0028533 A1 | 2/2006 | Nakajima |
| 2006/0132880 A1 | 6/2006 | Amada et al. |
| 2006/0158711 A1 | 7/2006 | Imai et al. |
| 2006/0209166 A1 | 9/2006 | Suzuki et al. |
| 2006/0232659 A1 | 10/2006 | Hayashi et al. |
| 2006/0232660 A1 | 10/2006 | Nakajima et al. |
| 2006/0232844 A1 | 10/2006 | Nakajima |
| 2006/0238845 A1 | 10/2006 | Atsuumi et al. |
| 2006/0245009 A1 | 11/2006 | Akiyama |
| 2006/0256185 A1 | 11/2006 | Suzuki et al. |
| 2006/0284968 A1 | 12/2006 | Hayashi et al. |
| 2007/0035796 A1 * | 2/2007 | Nakajima ................ 359/204 |
| 2007/0058232 A1 | 3/2007 | Nakajima et al. |
| 2007/0058255 A1 | 3/2007 | Imai et al. |
| 2007/0081152 A1 | 4/2007 | Amada |
| 2007/0097474 A1 | 5/2007 | Amada et al. |
| 2007/0122192 A1 * | 5/2007 | Yamakawa et al. .......... 399/151 |
| 2007/0146738 A1 | 6/2007 | Nakajima |
| 2007/0146851 A1 | 6/2007 | Nakajima |
| 2007/0146856 A1 | 6/2007 | Nakajima |
| 2007/0189008 A1 | 8/2007 | Amada et al. |
| 2007/0206259 A1 | 9/2007 | Nakajima |
| 2007/0206261 A1 | 9/2007 | Hayashi et al. |
| 2007/0211324 A1 | 9/2007 | Sakai et al. |
| 2007/0242127 A1 | 10/2007 | Omori et al. |
| 2007/0253048 A1 | 11/2007 | Sakai et al. |
| 2007/0297036 A1 | 12/2007 | Nakamura et al. |
| 2008/0024589 A1 | 1/2008 | Ueda et al. |
| 2008/0024590 A1 | 1/2008 | Nakajima |
| 2008/0024849 A1 | 1/2008 | Hayashi et al. |
| 2008/0025759 A1 | 1/2008 | Ichii et al. |
| 2008/0055690 A1 | 3/2008 | Nakamura et al. |
| 2008/0055692 A1 | 3/2008 | Saisho et al. |
| 2008/0062491 A1 | 3/2008 | Nakamura et al. |
| 2008/0068689 A1 | 3/2008 | Saisho et al. |
| 2008/0068693 A1 | 3/2008 | Hayashi et al. |
| 2008/0069585 A1 | 3/2008 | Amada |
| 2008/0123159 A1 | 5/2008 | Hayashi et al. |
| 2008/0170282 A1 | 7/2008 | Amada et al. |
| 2008/0180772 A1 | 7/2008 | Miyatake et al. |
| 2008/0192323 A1 | 8/2008 | Nakamura et al. |
| 2008/0204840 A1 | 8/2008 | Watanabe et al. |
| 2008/0204841 A1 | 8/2008 | Suzuki et al. |
| 2008/0204852 A1 | 8/2008 | Amada et al. |
| 2008/0218827 A1 | 9/2008 | Watanabe et al. |
| 2009/0052944 A1 * | 2/2009 | Kubo et al. ................ 399/220 |

FOREIGN PATENT DOCUMENTS

| | | |
|---|---|---|
| JP | 2002-341273 | 11/2002 |
| JP | 2003-211728 | 7/2003 |
| JP | 2004-6592 | 1/2004 |

* cited by examiner

LIGHT SOURCE UNIT, OPTICAL SCAN APPARATUS, AND IMAGE FORMATION APPARATUS

CROSS-REFERENCE TO RELATED APPLICATION

The present application is based on and claims priority from Japanese Patent Application No. 2007-226178, filed on Aug. 31, 2007, and No. 2008-82308, filed on Mar. 27, 2008, the disclosure of which is hereby incorporated by reference in its entirety.

BACKGROUND OF THE INVENTION

1. Field of the Invention

The present invention relates to a light source unit emitting a light beam, an optical scan apparatus scanning a scan surface with a plurality of light beams and an image formation apparatus incorporating such an optical scan apparatus.

2. Description of Related Art

In the prior art, an image formation apparatus forming images by Carlson process is known. For example, such an image formation apparatus scans the surface of a rotating photoconductive drum with a light beam to form an electrostatic latent image, visualizes the electrostatic latent image as a toner image, and fuses the toner image on a sheet of paper as a recording medium to form an image. This type of the image formation apparatus has been popularly used in simple printmaking for an on-demand print system. There has been increasing demand for high-density images and high-speed image outputs.

Japanese Laid-open Patent Application Publication No. 2003-211728, for example, discloses an image formation apparatus which has a light source such as a vertical cavity surface emitting laser (VCSEL) array with plural light emission portions two-dimensionally, monolithically arranged and is capable of concurrently scanning a scan surface with plural light beams.

Such a vertical cavity surface emitting laser array used in the image formation apparatus is composed of the light emission portions on a chip contained in a package, which is made of a ceramic material or the like. For mounting the light emission portions on a circuit board by soldering, the mounted light emission portions are not uniform in height. With such non-uniformity in height, the surface of the package is inclined relative to the surface of the circuit board. As a result, positional relations between the individual light emission portions and the circuit board surface may not be the same.

In such a light source unit the positions of optical elements such as a coupling element (lens) are often determined on the basis of the circuit board surface. In this case, there will be a problem that the positional difference between each light emission portion and the circuit board surface leads to a positional difference between the optical elements and each light emission portion.

For prevention of such a problem, Japanese Laid-open Patent Application Publication No. 2004-6592 discloses a method for positioning the package surface relative to the optical elements in a semiconductor laser unit by elastically bending the circuit board to bring the package into contact with the surface of a support member by pressure.

However, such a method still has a problem that enforcedly bending the circuit board causes solder of electric components mounted thereon to be peeled off, which may adversely accelerate deterioration of the laser unit over time, for example.

SUMMARY OF THE INVENTION

In view of solving the above problems, an object of the present invention is to provide a light source unit in which a light source can be precisely positioned relative to an optical system at three places, so as to stably form high quality images, as well as to provide an optical scan apparatus incorporating such a light source unit and an image formation apparatus incorporating such an optical scan apparatus.

According to a first aspect of the present invention, a light source unit comprises a light source with a plurality of light emission portions two-dimensionally arranged, a substrate on which the light source is mounted, a first support portion supporting the substrate, a bias member biasing the substrate towards the first support portion, a coupling element coupling a light beam emitted from the light source, a second support portion supporting the coupling element, and a holding member holding a position of the substrate relative to the first support portion.

Preferably, the light source comprises a light emitting element including a plurality of light emission portions and a package containing the light emitting element. Further, in order to position the light source relative to the first support portion, the bias member biases the substrate towards the first support portion to make the package in contact with the first support portion.

Preferably, the bias member comprises an anchor portion which latches the substrate to restrict movement thereof in a direction orthogonal to an optical axis of the light source.

Preferably, the holding member is attached to the first support portion and is movable in an optical axis direction of the coupling element.

Preferably, the holding member is attached to the first support portion and comprises an engaging portion which is engaged with the substrate.

Preferably, the holding member holds the substrate in a direction orthogonal to an optical axis of the coupling element.

Preferably, the engaging portion is formed in one of wedge and trapezoid shapes.

Preferably, the light source comprises a plurality of holding members holding a position of the substrate relative to the first support portion.

Preferably, the light source unit further comprises a connector mounted on the substrate and connected with a wiring from outside, in which the holding member holds neighborhood of a portion of the substrate on which the connector is mounted.

Preferably, the holding member is disposed on a line in parallel to a direction from which the connector is connected or disconnected with the wiring.

According to a second aspect of the present invention, an optical scan apparatus scanning a scan surface with a light beam comprises the light source unit according to the first aspect of the present invention, an optical deflector deflecting a light beam emitted from the light source unit, and an optical imaging system focusing the light beam deflected by the optical deflector on the scan surface.

Preferably, in the optical scan apparatus, the light source unit is rotatably supported around the optical axis of the coupling element.

According to the third aspect of the present invention, an image formation apparatus which forms a toner image according to an electrostatic latent image obtained by image information, and fuses the toner image on a recording medium for image formation, comprises the above optical scan apparatus, a photoconductive drum on which an electronic latent image is formed by the optical scan apparatus, a develop unit visualizing the electrostatic latent image formed on the photoconductive drum, and a transfer unit fusing a toner image visualized by the develop unit on a recording medium.

BRIEF DESCRIPTION OF THE DRAWINGS

FIG. 7B is a plain view of a light emitting element 10a;

DETAILED DESCRIPTION OF THE PREFERRED EMBODIMENTS

First Embodiment

Figure 1:
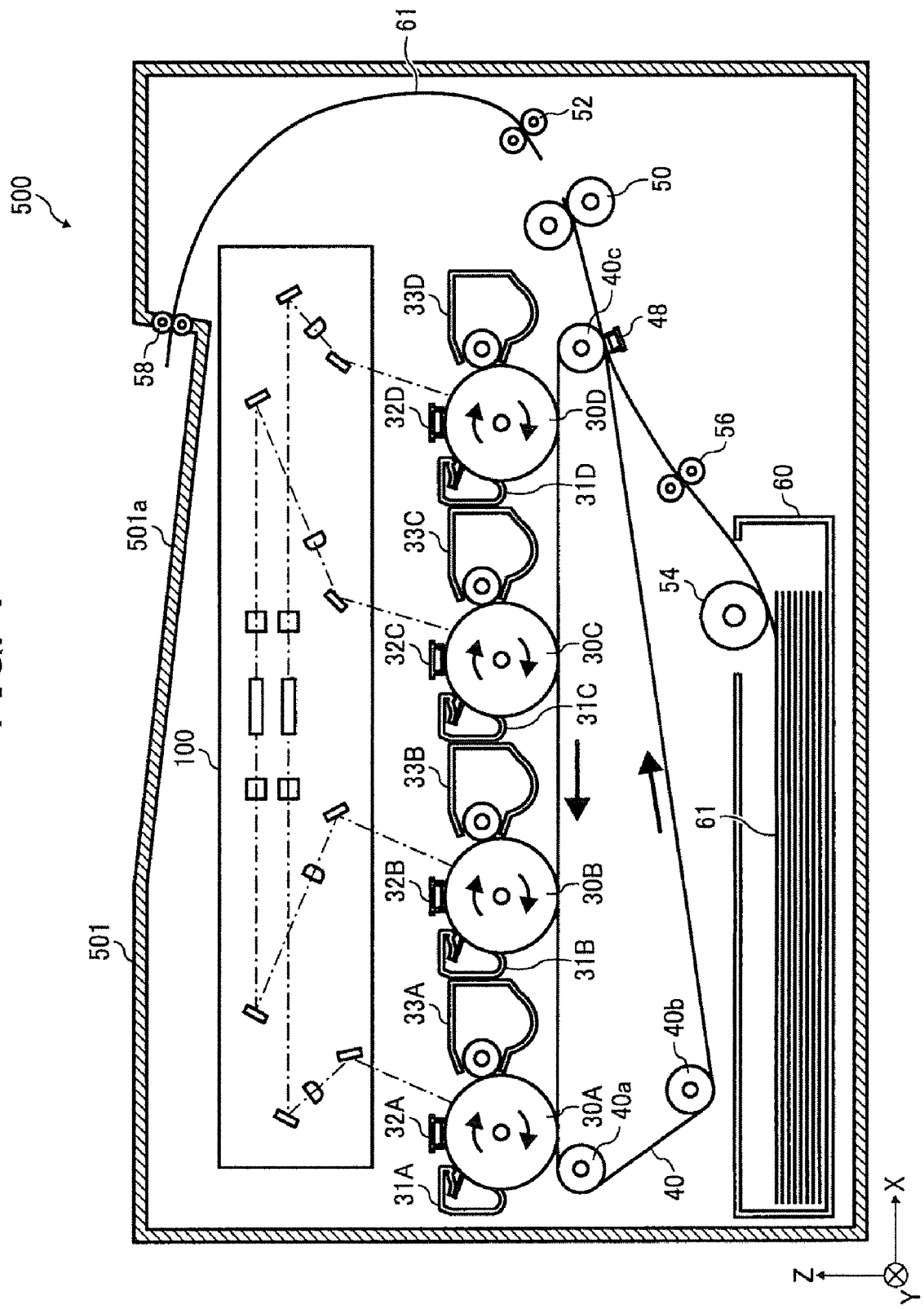
FIG. 1 is a schematic view of an image formation apparatus 500 according to the first embodiment of the present invention.

Hereinafter, the first embodiment of the present invention will be described in detail with reference to FIGS. 1 to 9. FIG. 1 shows an image formation apparatus 500 according to the present embodiment.

The image formation apparatus 500 is, for example, a tandem type color printer which prints multi-color images by superimposing and transferring black, yellow, magenta, and cyan color toner images onto sheets of paper. The image formation apparatus 500 as shown in FIG. 1 comprises an optical scan apparatus 100, four photoconductive drums 30A to 30D, a transfer belt 40, a paper feed tray 60, a paper feed roller 54, a first resist roller 56, a second resist roller 52, a fuse roller 50, a paper discharge roller 58, a not-shown controller collectively controlling the respective components, and a housing 501 in rectangular solid shape accommodating the components.

A paper discharge tray 501a on which printed sheets are discharged is formed on the top surface of the housing 501. The optical scan apparatus 100 is disposed under the paper discharge tray 501a.

The optical scan apparatus 100 scans the photoconductive drum 30A with a light beam for black image components modulated by image information supplied from a higher-level device (such as personal computer). Similarly, it scans the photoconductive drum 30B with a light beam for cyan image components, the photoconductive drum 30C with a light beam for magenta image components, and the photoconductive drum 30D with a light beam for yellow image components. The structure of the optical scan apparatus 100 will be described later.

The four photoconductive drums 30A to 30D are cylindrical members and have photoconductive layers on their surfaces which become electrically conductive when illuminated with a light beam. They are disposed with equal interval in an X-axis direction under the optical scan apparatus 100 in FIG. 1.

The photoconductive drum 30A is disposed at end of a reverse X-axis direction (left side in FIG. 1) inside the housing 15 so that its longitudinal direction is to be the Y-axis direction. The photoconductive drum 30A is rotated by a not-shown rotation mechanism clockwise (as indicated by black arrows) in FIG. 1. Around the photoconductive drum 30A disposed are an electric charger 32A at 12 o'clock position (upper side), a toner cartridge 33A at 2 o'clock position and a cleaning case 31A at 10 o'clock position.

The electric charger 32A is disposed with a predetermined clearance over the surface of the photoconductive drum 30A with its longitudinal direction as the Y-axis direction. It electrically charges the surface of the photoconductive drum 30A with a predetermined voltage.

The toner cartridge 33A includes a cartridge body containing a toner of black image components and a develop roller charged with a voltage of reverse polarity of that of the photoconductive drum 30A, and the like. The toner cartridge 33A supplies the toner in the cartridge body to the surface of the photoconductive drum 30A via the develop roller.

The cleaning case 31A is provided with a cleaning blade of a rectangular shape with its longitudinal direction as the Y-axis direction, and it is disposed so that one end of the cleaning blade gets in contact with the surface of the photoconductive drum 30A. The toner sticking on the surface of the photoconductive drum 30A is removed by the cleaning blade along with the rotation of the photoconductive drum 30A and collected in the cleaning case 31A.

The photoconductive drums 30B, 30C, 30D with the same structure as that of the photoconductive drum 30A are placed in sequence on the right side of the photoconductive drum 30A with a predetermined interval. They are rotated by a not-shown rotation mechanism clockwise (as indicated by the black arrows) in FIG. 1. Similarly to the photoconductive drum 30A, electric chargers 32B, 32C, 32D, toner cartridges 33B, 33C, 33D, cleaning cases 31B, 31C, 31D are disposed around the photoconductive drums 30B, 30C, 30D, respectively.

The electric chargers 32B, 32C, 32D with the same structure as that of the electric charger 32A are disposed to electrically charge the surfaces of the photoconductive drums 30B, 30C, 30D with a predetermined voltage, respectively.

The toner cartridges 33B, 33C, 33D include cartridge bodies containing toners of cyan, magenta, yellow image components and develop rollers charged with a voltage of reverse polarity of that of the photoconductive drums 30B, 30C, 30D, and the like, respectively. The toner cartridges 33B, 33C, 33D supply the toners in the cartridge bodies to the surfaces of the photoconductive drums 30B, 30C, 30D via the develop rollers, respectively.

The structure and function of the cleaning cases 31B, 31C, 31D are the same as those of the cleaning case 31A.

Hereinafter, a unit of the photoconductive drum 30A, the electric charger 32A, the toner cartridge 33A, and the cleaning case 31A is to be referred to as the first image formation station; likewise, a unit of the photoconductive drum 30B, the electric charger 32B, the toner cartridge 33B, and the cleaning case 31B as the second image formation station, a unit of the photoconductive drum 30C, the electric charger 32C, the toner cartridge 33C, and the cleaning case 31C as the third image formation station, and a unit of the photoconductive drum 30D, the electric charger 32D, the toner cartridge 33D, and the cleaning case 31D as the fourth image formation station.

The transfer belt 40 is a free end ring-like member and rolls over driven rollers 40a, 40c placed under the photoconductive drums 30A, 30D, respectively, and rolls over a drive roller 40B which is placed at a slightly lower position than the driven rollers 40a, 40c. The upper end surface of the transfer belt 40 is in contact with the lower end surfaces of the photoconductive drums 30A, 30B, 30C, 30D. The transfer belt 40 is rotated counterclockwise (as indicated by the black arrows in FIG. 1) by counterclockwise rotation of the drive roller 40b. A transfer charger (transfer unit) 48 is applied with a voltage of a reverse polarity of that of the electric chargers 32A, 32B, 32C, 32D and is placed close to one end of the transfer belt 40 in the X-axis direction (right side in FIG. 1).

The paper feed tray 60 of a substantially rectangular solid shape is placed under the transfer belt 40 and contains piled-up paper sheets 61 for printing. The paper feed tray 60 has a feeder outlet of a rectangular shape close to one end of the upper surface thereof in the X-axis direction (right side in FIG. 1).

The paper feed roller 54 extracts paper sheets 61 one by one from the paper feed tray 60 to feed them to a gap formed between the transfer belt 40 and the transfer charger 48 via the first resist roller 56 composed of a pair of rotary rollers.

The fuse roller 50 is composed of a pair of rotary rollers, and applies heat and pressure to the paper sheets 61 to feed the paper sheets 61 to the discharge roller 58 via the resist roller 52 composed of a pair of rotary rollers. The discharge roller 58 is composed of a pair of rotary rollers and discharges the paper sheets 61 to the discharge tray 501a.

Figure 2:
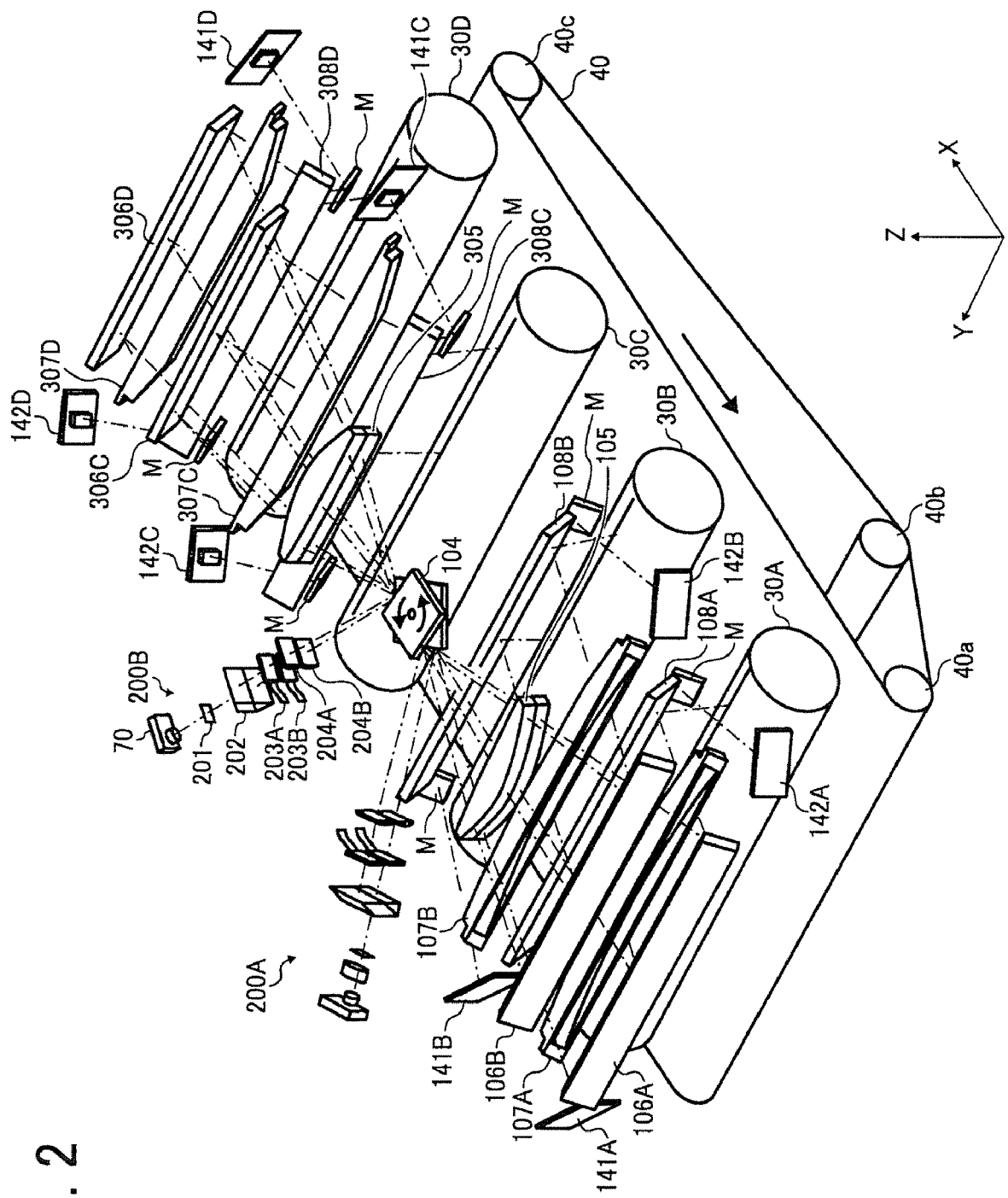
FIG. 2 is a perspective view of an optical scan apparatus 100 according to the first embodiment of the present invention.
Figure 3:
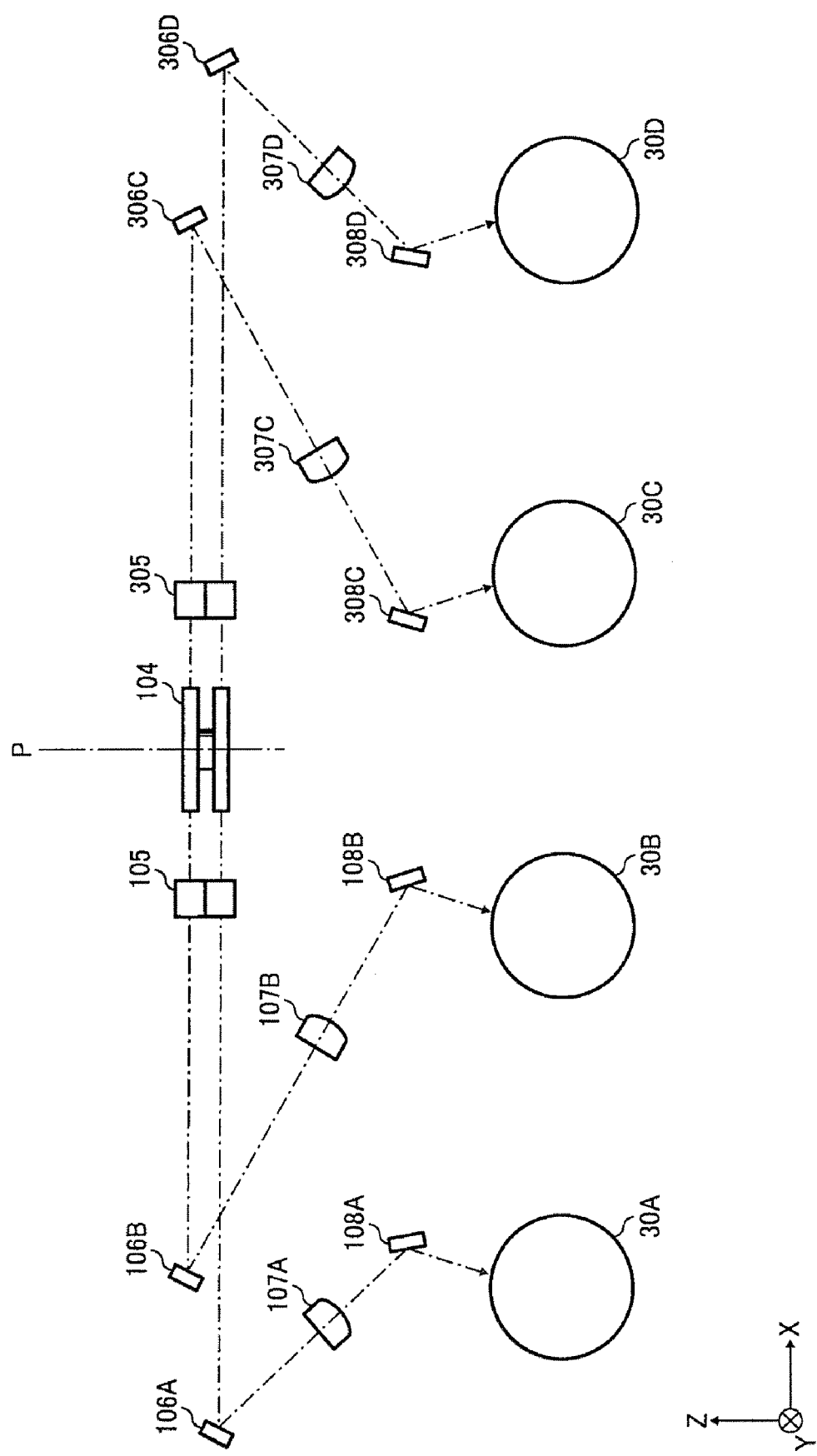
FIG. 3 is a side view of the optical scan apparatus 100.

Next, with reference to FIGS. 2 and 3, the structure of the optical scan apparatus 100 will be described. FIG. 2 is a perspective view of the optical scan apparatus 100 and FIG. 3 is a side view thereof.

The optical scan apparatus 100 comprises an optical imaging system and two optical incidence systems 200A, 200B. The optical imaging system is composed of a polygon mirror 104, an fθ lens 105, reflective mirrors 106B, 106A disposed in sequence in the reverse X-axis direction of the polygon mirror 104, a reflective mirror 108B disposed under the fθ lens 105, a toroidal lens 107B disposed between the reflective mirrors 106B and 108B, a reflective mirror 108A disposed in the reverse X-axis direction of the reflective mirror 106B, and a toroidal lens 107A disposed between the reflective mirrors 106A and 108A, as well as an fθ lens 305 and reflective mirrors 306C, 306D disposed in sequence in the X-axis direction of the polygon mirror 104, a reflective mirror 308C disposed under the fθ lens 305, a toroidal lens 307C disposed between the reflective mirrors 306C and 308C, a reflective mirror 308D disposed in the X-axis direction of the reflective mirror 308C, and a toroidal lens 307D disposed between the reflective mirrors 306D and 308D.

The optical incidence system 200A allows light beams for scanning the photoconductive drums 30A, 30B to be incident on the polygon mirror 104, while the optical incidence system 200B allows light beams for scanning the photoconductive drums 30C, 30D to be incident on the polygon mirror 104.

The optical incidence systems 200A, 200B are optical systems to make light beams to be incident on the deflection surface of the polygon mirror 104 from a direction which makes an angle of 120 or 60 degrees relative to the X axis. As representatively shown in FIG. 2, the optical incidence system 200B includes a light source unit 70, and an aperture member 201, a beam splitter prism 202, a pair of liquid crystal elements 203A, 203B, and a pair of cylindrical lenses 204A, 204B which are disposed in sequence along the path for the light beam from the light source unit 70. For the sake of simplicity, xyz coordinate system is defined here by rotating XY coordinates by 30 degrees around the Z axis in FIG. 2

Figure 4:
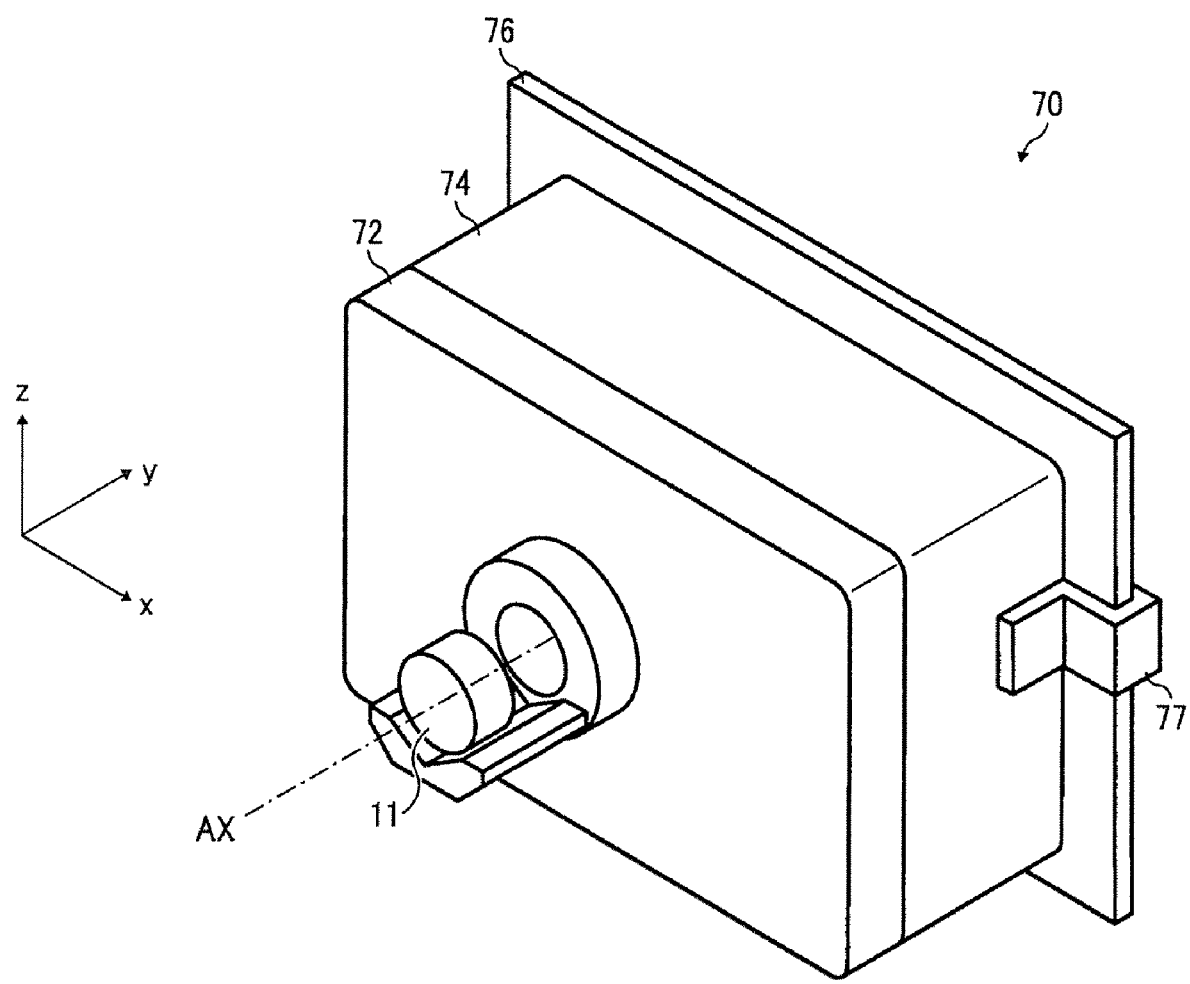
FIG. 4 is a perspective view of a light source unit 70 according to the first embodiment of the present invention.

FIG. 4 is a perspective view of the light source unit 70 which comprises a substrate 76, a first support portion 74, a second support portion 72 supporting a coupling element 11, and a holding member to maintain a positional relation between the substrate and the first support portion.

Figure 5:
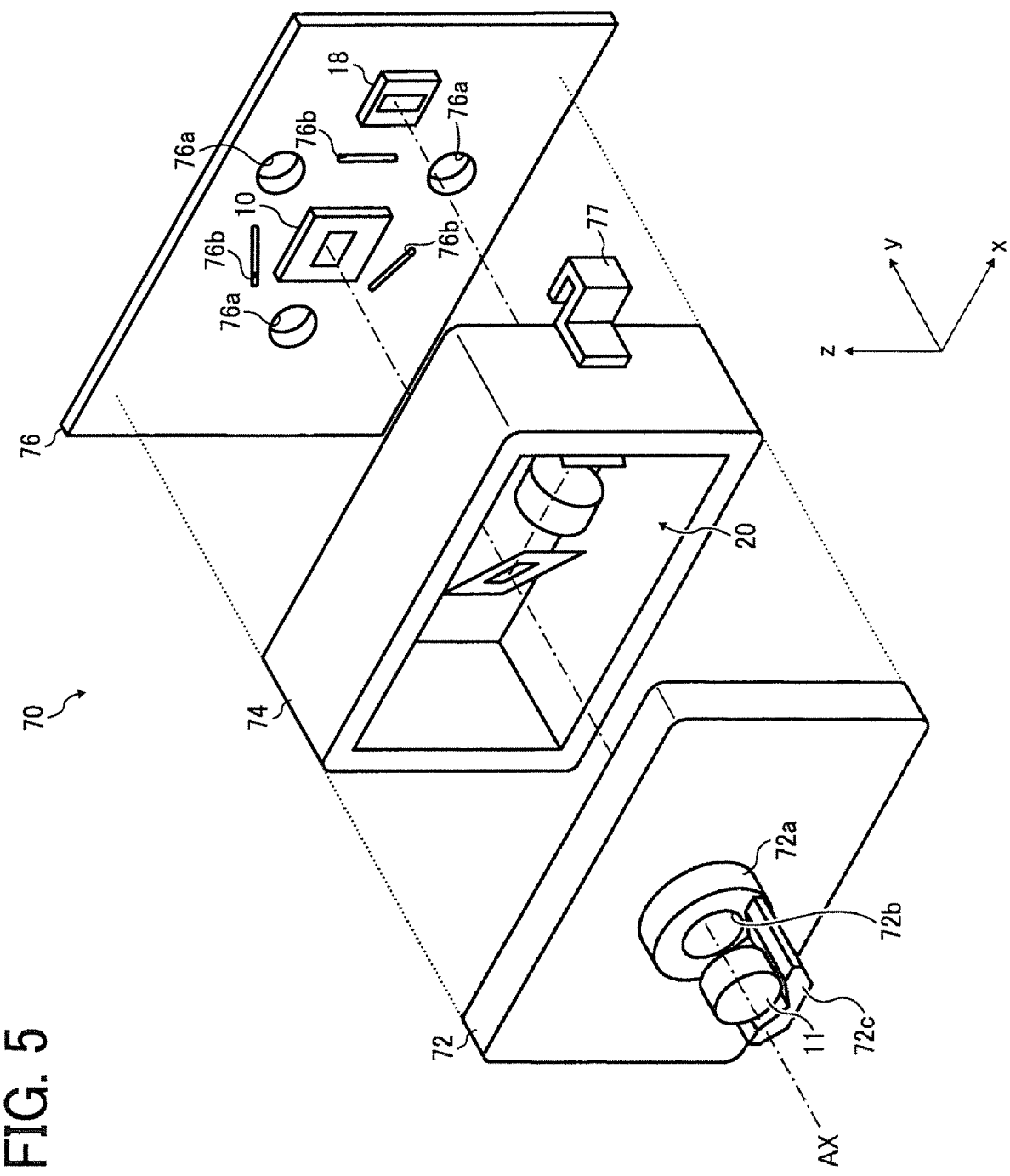
FIG. 5 is a first development view of the light source unit 70.
Figure 6:
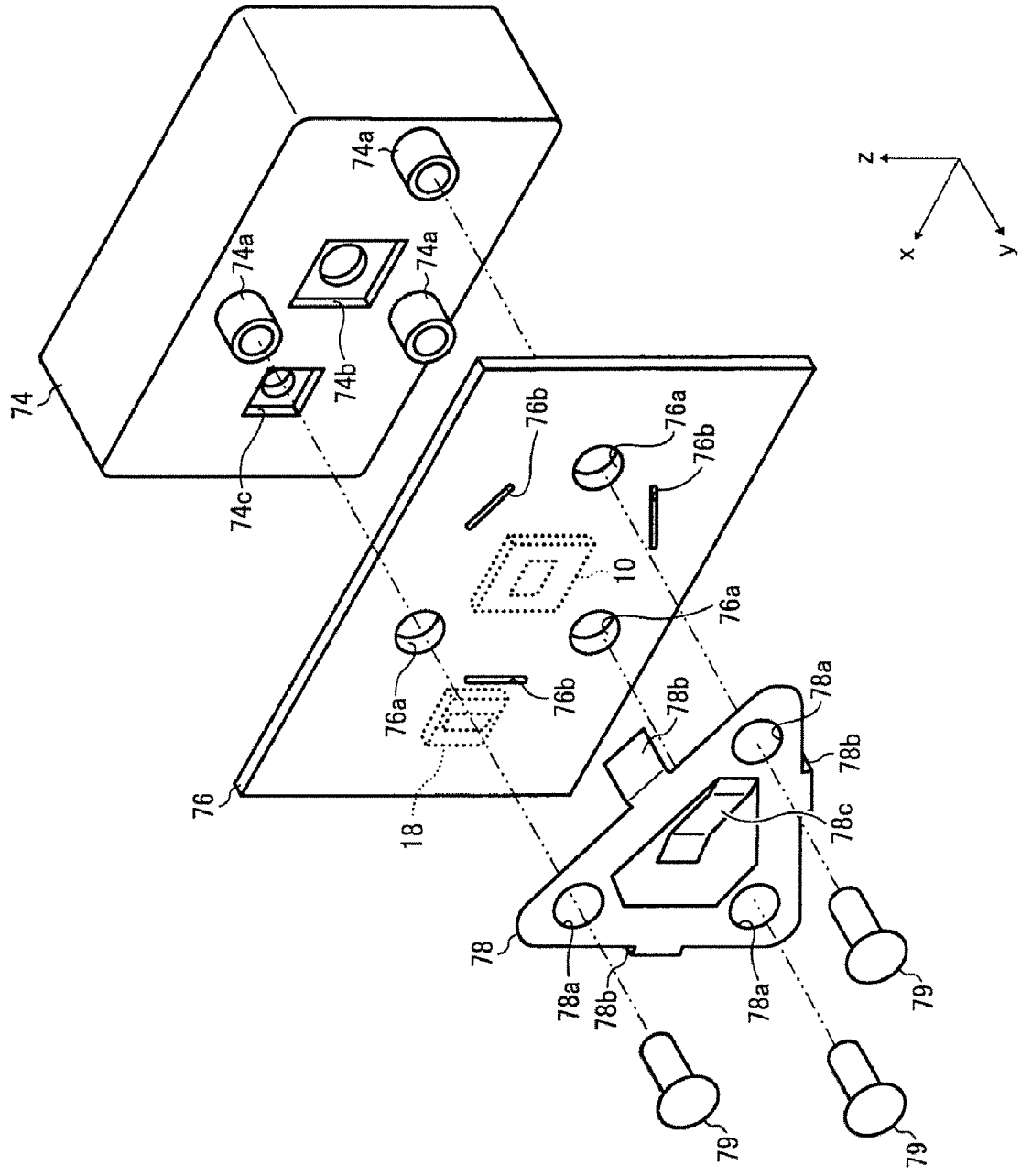
FIG. 6 is a second development view of the light source unit 70.

FIGS. 5, 6 are perspective development views of the light source unit 70. As shown in the drawings, a longitudinal direction of the substrate 76 is the x-axis direction, and it has a light source 10 and a light-receiving element 18 on a surface in the reverse y-axis direction, and a drive circuit driving the light source 10 and a monitor circuit monitoring signals from the light receiving element 18 on the opposite surface, for example. Also, three round holes 76a and three slits 76b are formed on the substrate 76 to surround the light source 10.

Figure 7A:
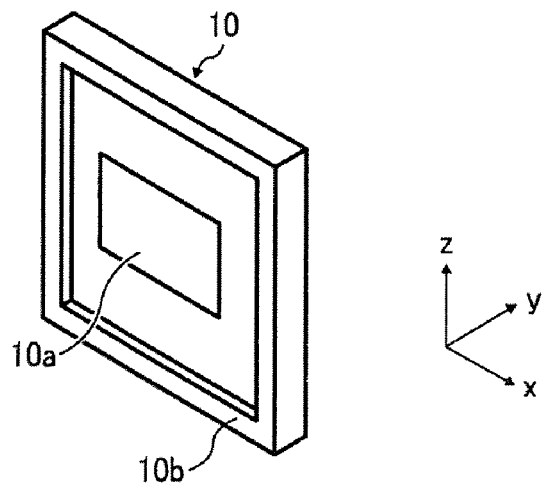
FIG. 7A is a perspective view of a light source 10.

FIG. 7A is a perspective view of the light source 10 which is a vertical cavity surface emitting laser (VCSEL) array including a package 10b of a square plate and a light emitting element 10a contained in the package 10b.

The package 10b is made of a ceramic material, for example, and includes a frame with xy and zy cross sections in U-form and a glass plate in size equivalent to that of the frame and attached to a reverse y-axis side surface thereof. It is filled with inert gas inside.

Figure 7B:
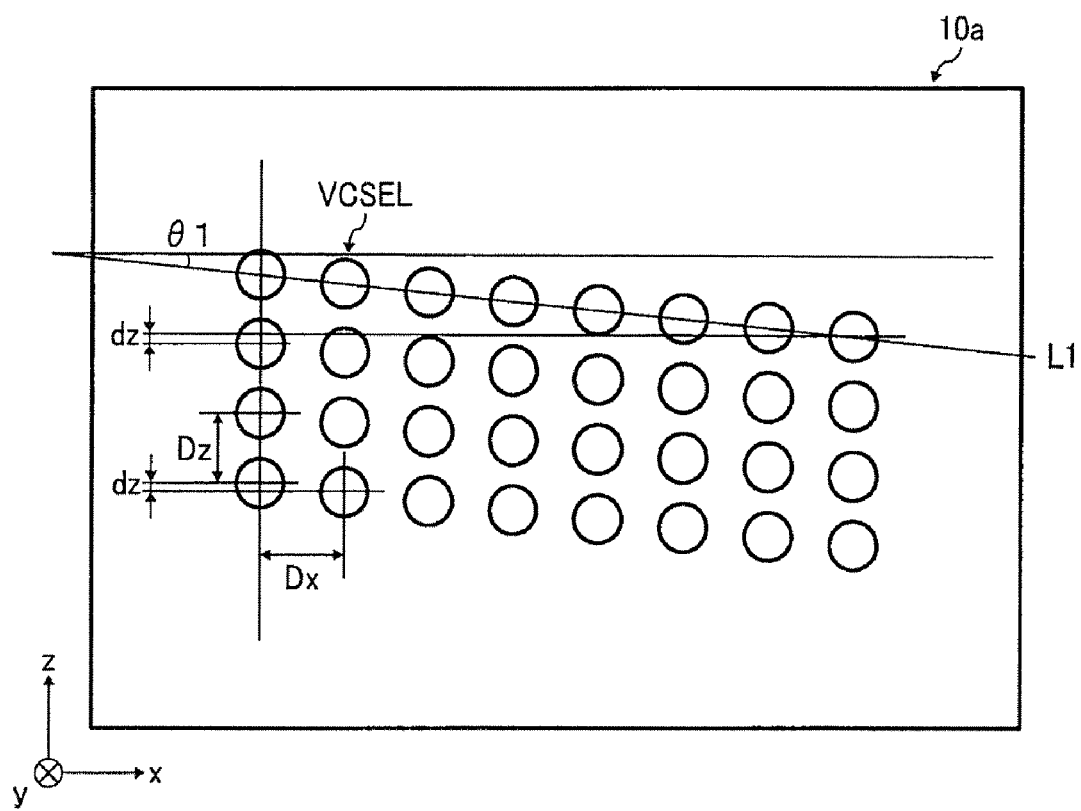

The light emitting element 10a includes a light emission plane on which a plurality of VCSELs (light emission portions) are two-dimensionally arranged. As shown in FIG. 7B, 32 VCSELs are arranged in matrix in 4 rows, 8 columns thereon (on the reverse y-axis side) to emit diffusion light in the reserve y direction. The row direction is parallel to a straight line L1 which makes an angle θ1 with the x axis while the column direction is parallel to the z axis. In the present embodiment, an interval Dz between the VCSELs in the sub scan direction is set to 18.4 μm and that Dx in the main scan direction is set to 30 μm, for example. Adjacent VCSELs in the z-axis (sub scan) direction are disposed with an interval dz of 2.3 μm (=Dz/8). The light emitting element 10a is contained in the package 10b such that the light emission plane is parallel to the surface of the package 10b on the reverse y side.

The light receiving element 18 in FIGS. 5, 6 is placed on the x-axis side of the light source 10 to output signals (photoelectric conversion signals) according to intensity of incident light beams. It is used for intensity detection of light beams from the light source 10.

The first support portion 74 is a box-like member with an open surface on the reverse y-axis side and accommodates an optical guide system 20 (FIG. 5). On a surface on the opposite side formed are rectangular concavities 74b, 74c to be fitted with the light source 10 and the light receiving element 18, as well as three cylindrical portions 74a around the concavity 74b to insert through the three round holes 76a, respectively. Also, a circular opening is formed on the bottom walls of the concavities 74b, 74c to be in communication with the first support portion 74.

As shown in FIG. 6, the substrate 76 and the first support portion 74 are joined with each other by fitting the light source 10 and light receiving element 18 into the concavities 74b, 74c and inserting the cylindrical portions 74a through the round holes 76a. The relative position therebetween is defined by mounting a substantially triangular bias member 78 on the cylindrical portions 74a of the first support portion 74.

Figure 8:
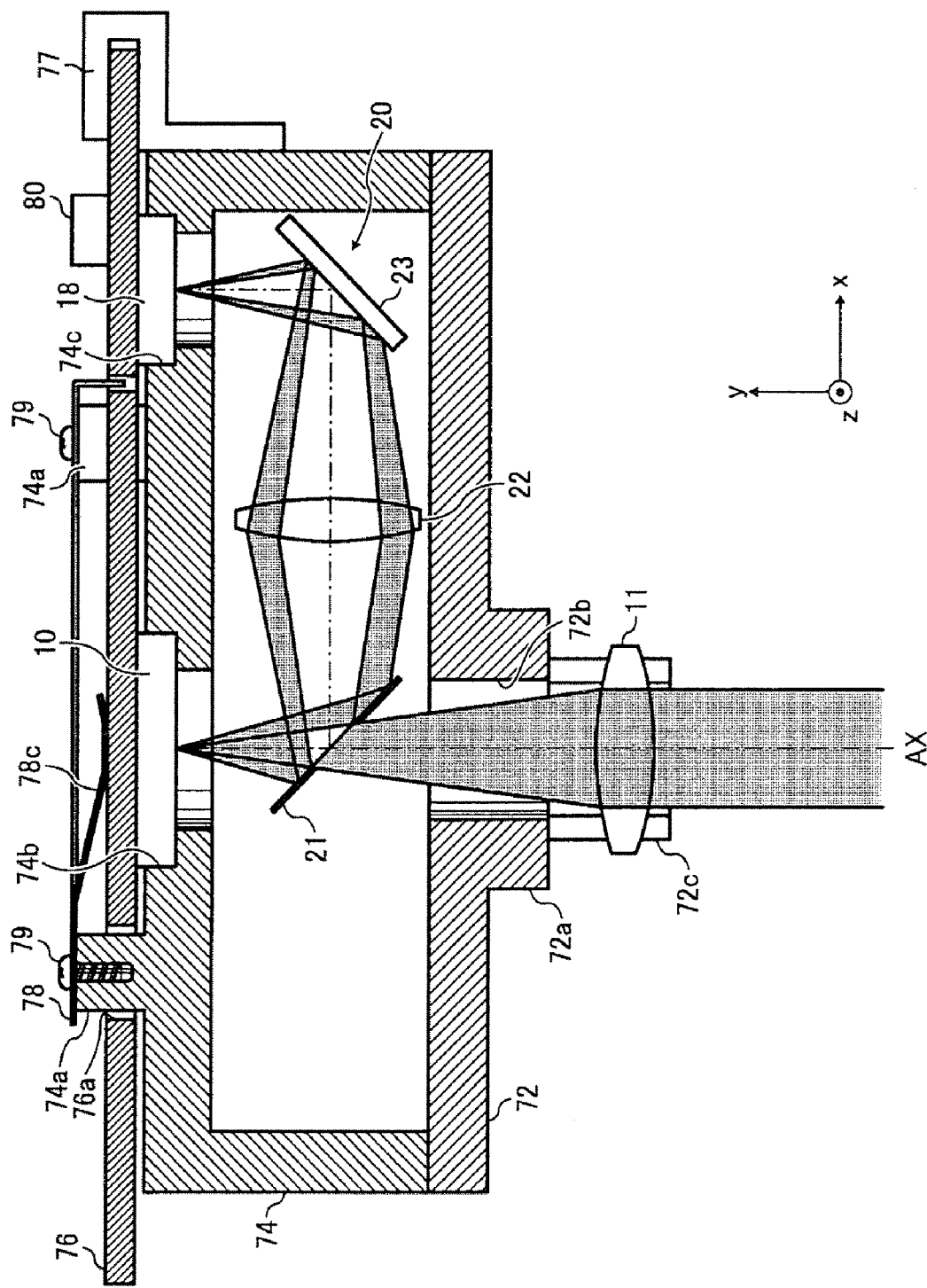
FIG. 8 is an x to y cross sectional view of the light source unit 70 in directions.

The bias member 78 is formed by sheet metal processing on an elastic plate member and provided with three anchor portions 78b and a blade spring 78c, for example. The anchor portions 78b are insertable through three slits 76b on the substrate 76. The blade spring 78c has elastic force acting in the reverse y-axis direction. The bias member 78 is fixed on the first support portion 74 by screws 79. The screws 79 are screwed into the cylindrical portions 74a of the first support portion 74 via the round holes 78a formed at the corners of the bias member 78, respectively while the anchor portions 78b are inserted into the slits 76b of the substrate 76. In such a manner, the blade spring 78c of the bias member 78 biases the substrate 76 in a direction to approach the first support portion 74, and the reverse y-axis side surfaces of the light source 10 and the light receiving element 18 are brought into contact with the bottom walls of the concavities 74b, 74c of the first support portion 74 by pressure, as shown in FIG. 8.

The holding member 77, as shown in FIG. 4, 5, is composed of a plate-like fixation portion fixed on the x-axis side of the first support portion 74 and a U-form gripper on the y-axis side of the fixation portion. The holding member 77 functions to maintain the defined relative positions between the substrate 76 and the first support portion 74 constantly by fixing the fixation portion on the first support portion 74 while gripping the substrate 76 with the gripper.

The second support portion 72 includes a plate-like body with a circular opening 72b at the center, a ring-like convexity 72a on the reverse y-axis side of the body to surround the circular opening 72b, and a lens support portion 72c extending from a lower part of the convexity 72a to the y-axis reverse direction. The lens support portion 72c has a groove with a V-form cross section on the top surface along the y axis to retain the coupling element 11 at a predetermined position in the x and z axis directions.

The coupling element 11 has a lens with a refractive index of about 1.5 to couple light beams from the light source 10.

The surface of thus-configured second support portion 72 on the y-axis side is fixed at the end of the reverse y-axis side of the first support portion 74 by screws or the like, for example.

The optical guide system 20 as shown in FIG. 8 comprises a beam splitter 21, a collective lens 22, and a reflective mirror 23 which are contained in the first support portion 74.

The beam splitter 21 is a plate-like member with a rectangular opening at the center and has a reflective surface reflecting light beams from the light source 10. The beam splitter 21 is retained to be inclined at 45 degrees relative to the y axis, to thereby have pass through the opening a part of a light beam incident from the y-axis side and reflect the rest of the light beam in the x-axis direction.

The collective lens 22 has a positive power and collects the light beam reflected in the x-axis direction by the beam splitter 21 on the light receiving surface of the light receiving element 18 via the reflective mirror 23.

Figure 9:
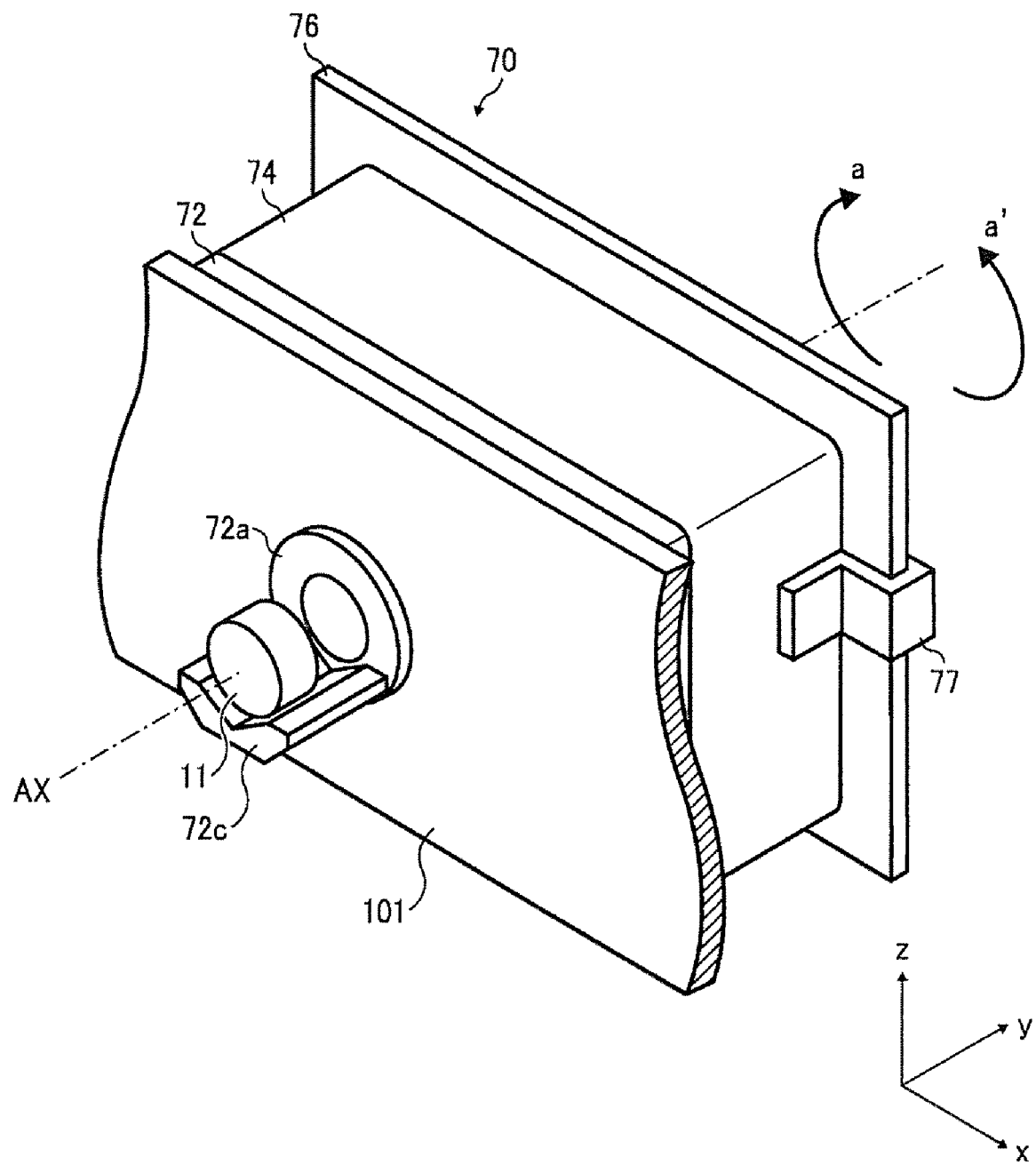
FIG. 9 shows how the light source unit 70 is mounted.

The light source unit 70 is, for example, configured to be rotatably supported around the optical axis of the coupling element 11 by fitting the convexity 72a of the second support portion 72 into the opening of a support member 101 of an optical housing or the like, as shown in FIG. 9. Accordingly, rotating the light source unit 70 relative to the optical elements after the aperture member 201 makes it possible to adjust the light beams to be collected on the photoconductive drums with a predetermined pitch in the sub scan direction. Also, the light source unit 70 is configured to be supplied with electric power from an external power supply via the connector 80 which is provided near the x-axis end of the y-axis side surface of the substrate 76.

Referring back to FIG. 2, the aperture member 201 has a rectangular opening whose longitudinal direction is the x-axis (main scan) direction and is disposed so that the center of the opening is positioned at or around the focus position of the coupling element 11 (FIG. 4) of the light source unit 70, for example.

The beam splitter prism 202 vertically (sub scan direction) splits a light beam having passed through the opening 21a of the beam splitter 21 into two light beams separated with a predetermined distance.

The liquid crystal elements 203A, 203B are vertically adjacent to each other to correspond with the two split light beams and deflect the light beams in the sub scan direction according to a voltage signal supplied from a not-shown controller.

The cylindrical lenses 204A, 204B are vertically adjacent to each other to correspond with the two split light beams and collect the incident light beams on the polygon mirror 104. The cylindrical lenses 204A, 204B have positive curvature at least in the sub scan direction, and function together with later-described toroidal lenses 107A to 107D as an optical face tangle error correction system which make deflection points on the deflection surface of the polygon mirror 104 conjugated with the photoconductive drums 30A to 30D in the sub scan direction.

The polygon mirror 104 is a pair of square prism members having deflection surfaces on side faces, and the two members are vertically adjacent to each other and shifted in phase from each other at 45 degrees. It is rotated at a certain angular velocity by a not-shown rotary mechanism in a direction of arrows in FIG. 2. The light beams are vertically split into two by the beam splitter prism 202 of the optical incidence system 200A or 200B and collected and deflected on the upper and lower deflection surfaces of the polygon mirror 104 respectively, thereby making the light beams incident alternatively on the photoconductive drums.

The fθ lenses 105, 305 each have image height in proportion with the incidence angle of the light beam and move, at a constant velocity relative to the Y-axis, an image plane of the light beam deflected at the certain angular velocity by the polygon mirror 104.

The reflective mirrors 106A, 106B, 306C, 306D are placed so that their longitudinal direction is to be the Y-axis direction, to return the light beams having passed through the fθ lenses 106, 305 to be incident on the toroidal lenses 107A, 107B, 307C, 307D.

The toroidal lenses 107A, 107B, 307C, 307D are placed so that their longitudinal direction is to be the Y-axis direction, to focus the returned light beams on the surfaces of photoconductive drums 30A to 30D via the reflective mirrors 108A, 108B, 308C, 308D whose longitudinal direction is the Y-axis direction, respectively.

Optical detectors 141A, 141B are placed near the ends of the beam incidence surfaces (Y-axis side) of the toroidal lenses 107A, 107B while optical detectors 141C, 141D are placed near the ends of the beam incidence surfaces (reverse Y-axis side) of the toroidal lenses 307C, 307D. Similarly, optical detectors 142A, 142B are placed near the ends of the reverse Y-axis side of the toroidal lenses 107A, 107B while optical detectors 142C, 142D are placed near the ends of the Y-axis side of the toroidal lens 307C, 307D. The optical detectors 141A to 141D, 142A to 142D output signals which turn on only while the light beam is incident.

Next, operation of the image formation apparatus 500 incorporating the optical scan apparatus 100 will be described. Upon receiving image information from a higher-level device or the like, a light beam from the light source unit 70 of the optical incidence system 200A passes through the aperture member 201 to be adjusted in beam form and is split vertically into two. The split light beams transmit through the liquid crystal elements 203A, 203B, respectively to be thereby position-corrected in the sub scan direction, and then are collected on the deflection surface of the polygon mirror 104 via the cylindrical lenses 204A, 204B. The light beams deflected by the polygon mirror 104 are incident on the fθ lens 105.

The upper light beam incident on the fθ lens 105 is reflected by the reflective mirror 106B and incident on the toroidal lens 107B. The toroidal lens 107B collects the light beam on the surface of the photoconductive drum 30B via the reflective mirror 108B. Meanwhile, the lower light beam incident on the fθ lens 105 is reflected by the reflective mirror 106A and incident on the toroidal lens 107A. The toroidal lens 107A collects the light beam on the surface of the photoconductive drum 30A via the reflective mirror 108A. With the phase shift at 45 degrees between the upper and lower deflection surfaces as described above, the photoconductive drums 30B, 30A are alternatively scanned with the upper and lower light beams in the reverse Y axis direction according to the output signals from the optical detectors 141A, 141B, 142A, 142B, respectively.

Similarly, a light beam from the light source unit 70 of the optical incidence system 200B passes through the aperture member 201 to be adjusted in beam form and is split vertically into two. The split light beams transmit through the liquid crystal elements 203A, 203B, respectively to be thereby position-corrected in the sub scan direction, and then are collected on the deflection surface of the polygon mirror 104 via the cylindrical lenses 204A, 204B. The light beams deflected by the polygon mirror 104 are incident on the fθ lens 305.

The upper light beam incident on the fθ lens 305 is reflected by the reflective mirror 306C and incident on the toroidal lens 307C. The toroidal lens 307C collects the light beam on the surface of the photoconductive drum 30C via the reflective mirror 308C. Meanwhile, the lower light beam incident on the fθ lens 305 is reflected by the reflective mirror 306D and incident on the toroidal lens 307D. The toroidal lens 307D collects the light beam on the surface of the photoconductive drum 30D via the reflective mirror 308D. With the phase shift at 45 degrees between the upper and lower deflection surfaces as described above, the photoconductive drums 30C, 30D are alternatively scanned with the upper and lower light beams in the Y axis direction according to the output signals from the optical detectors 141C, 141C, 142D, 142D, respectively.

Further, in the light source unit 70 a light beam from the light source 10 is reflected by the reflective surface of the beam splitter 21 and incident on the light receiving element 18 via the collective lens 22 and the reflective mirror 23. In the light source unit 70 signals are outputted when the light beam is incident on the light receiving element 18 and they are constantly monitored to adjust amount of the light beam from the light source 10.

Specifically, after deflected by the polygon mirror 104 but before reaching the scan area of the photoconductive drum, the light beam is received by the light receiving element 18 which outputs a photoelectric conversion signal upon receipt. The light source unit 70 is configured to detect intensity of the light beam from the light source 10 according to the photoelectric conversion signal from the light receiving element 18 and set a value of a current supplied to each VCSEL so that the intensity of the light beam is to be a preset value. Accordingly, having passed through the opening 21a of the beam splitter 21, the light beam at the preset intensity is incident on the scan areas of the photoconductive drums 30A to 30D. The value of current is reset upon completion of scanning the scan areas and set again before the next scanning. Thus, output of each VCSEL is adjusted for every scanning.

The photoconductive layers on the surfaces of the photoconductive drum 30A, 30B, 30C, 30D are charged with the electric chargers 32A, 32B, 32C, 32D at a predetermined voltage, therefore, electric charges are distributed at a fixed density thereon. When the photoconductive drums 30A, 30B, 30C, 30D are scanned with the light beams, portions of the photoconductive layers on which the light beams are gathered become conductive and the electric potential of the portions is substantially zero. Accordingly, by scanning the photoconductive drums 30A, 30B, 30C, 30D rotating in the direction indicated by the arrows in FIG. 1 with the light beams modulated according to the image information, electrostatic latent images defined by distributed charges are formed thereon.

The develop rollers of the toner cartridges 33A, 33B, 33C, 33D in FIG. 1 supply toners to the electrostatic latent images on the surfaces of the photoconductive drums 30A, 30B, 30C, 30D, respectively. At this point, since the develop rollers of the toner cartridges 33A, 33B, 33C, 33D (develop unit) are charged with a voltage of reverse polarity of that of the photoconductive drum 30A, 30B, 30C, 30D, the toners attached to the develop rollers are charged with the same polarity of that of the photoconductive drum 30A, 30B, 30C, 30D. Because of this, the toners are not attached to the portions on which the electric charges are distributed but only attached to the portions scanned with the light beams. Thereby, the electrostatic latent images are visualized as toner images on the surfaces of the photoconductive drum 30A, 30B, 30C, 30D.

As described above, the respective toner images formed by the first to fourth image formation stations according to image information are superimposedly transferred onto the surface of the transfer belt 40. The toner images on the transfer belt 40 are transferred by the transfer charger 48 onto the paper sheets 61 extracted from the paper feed tray 60 and fused by the fuse roller 50. The paper sheets 61 with the images thereon are discharged by the discharge roller 58 and stacked up sequentially in the paper discharge tray 501a.

As described above, the light source unit 70 according to the present embodiment comprises the bias member 78 which biases the substrate 76 towards the first support portion 74 so that the surface of the light source 10, specifically, the surface (reverse y-axis side) of the package 10b (FIG. 7(A)) is brought in contact with the bottom wall of the concavity 74b by pressure. This enables precise positioning of the light source 10 relative to the first support portion 74. Further, after the bias member 78 defines the positional relation between the substrate 76 and the first support portion 74, the holding member 77 is fixed to the first support portion 74 while the gripper is gripping the substrate 76. Thereby, it is possible to constantly maintain the defined relative positions between the substrate 76 and the first support portion 74, resulting in constantly maintaining the positional relation between the coupling element 11 supported by the second support portion and the light source 10.

Moreover, the holding member 77 as shown in FIG. 8 grips the neighborhood of the connector 80 on the substrate 76. This can prevent the relative position between the substrate 76 and the first support portion 74 from being changed due to receiving the impact from attachment/detachment of the wiring from/to the connector 80, or the substrate 76's accidentally getting in contact with other components during maintenance work or the like, for example.

The bias member 78 is configured to have the anchor portions 78b to be inserted through the slits 76b on the substrate 76, when fixed to the first support portion 74. This also makes it possible to prevent the relative position between the substrate 76 and the first support portion 74 from being changed.

Further, the optical scan apparatus 100 according to the present embodiment comprises the light source unit 70 in which the holding member 77 can stably maintain the positional relation between the light source 10 and the coupling element 11. This can avoid varying the imaging characteristics of the light beams on the photoconductive drums 30A to 30D over time, enabling stable, accurate scanning on the photoconductive drums 30A to 30D.

Further, the light source unit 70 is rotatably disposed around the optical axis of the coupling element 11. Accordingly, rotating the light source unit 70 relative to the optical elements after the aperture member 201 makes it possible to adjust the light beams to be collected on the photoconductive drums with a predetermined pitch in the sub scan direction.

Further, the image formation apparatus 500 according to the present embodiment forms images based on the electrostatic latent images formed by the optical scan apparatus 100. Therefore, it can stably form accurate images on the paper sheets 61.

Moreover, in the image formation apparatus 500 according to the present embodiment, the beam splitter 21 is configured to split the light beams from each VCSEL of the light source 10 by having only the light beam including chief ray pass therethrough and reflecting the other light beams. This makes it possible to scan the photoconductive drums 30A to 30D with the light beams with high intensity having passed through the opening 21a, and at the same time use the light beams not contributing to scanning for the intensity monitoring. In this manner, light beam use efficiency can be improved.

Second Embodiment

Next, the second embodiment of the present invention will be described with reference to FIGS. 10 to 14. A description of the same components as those in the first embodiment will be simplified or omitted.

Figure 10:
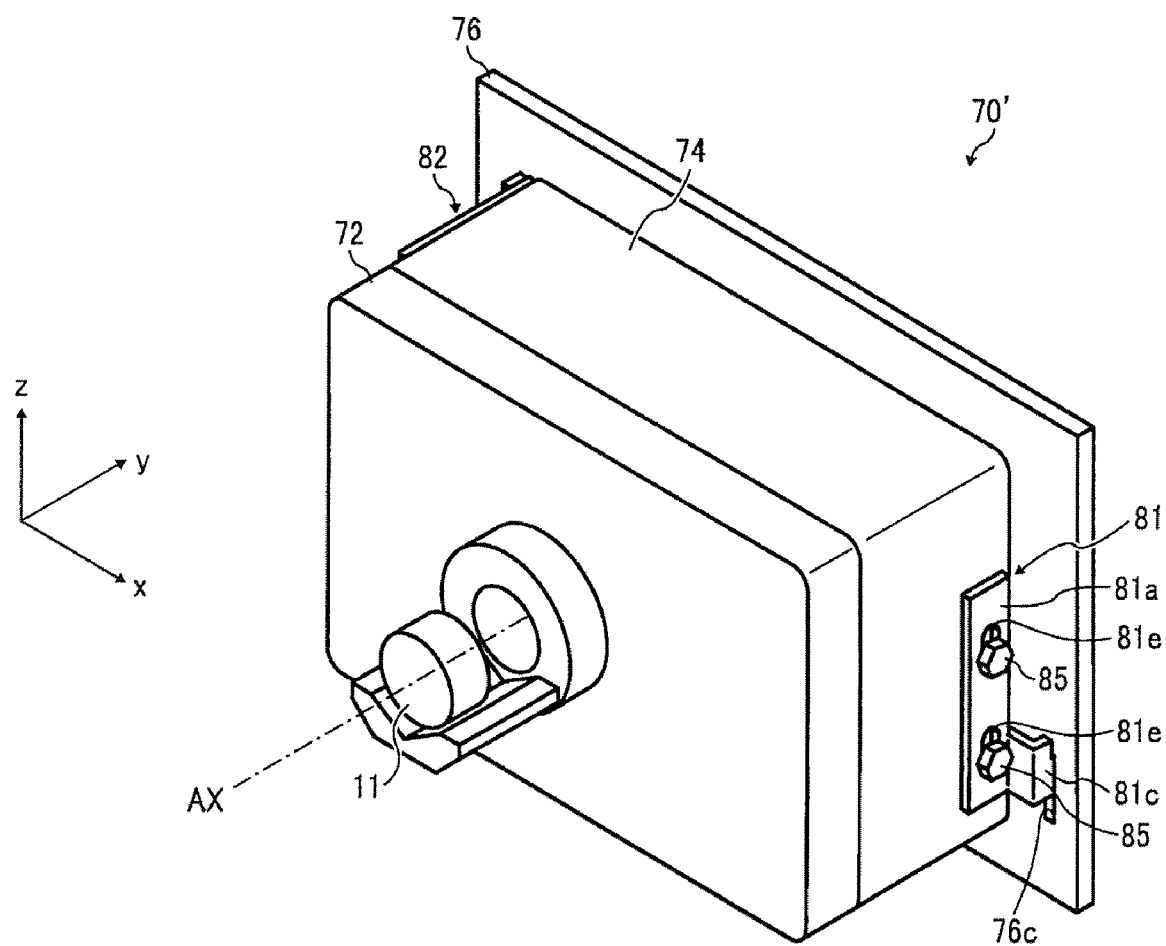
FIG. 10 is a perspective view of a light source unit 70' according to the second embodiment of the present invention.

FIG. 10 shows a light source unit 70' according to the second embodiment. The light source unit 70' is different from the light source unit 70 in that the substrate 76 and the first support portion 74 are joined by use of a pair of holding members 81, 82.

Figure 11A:
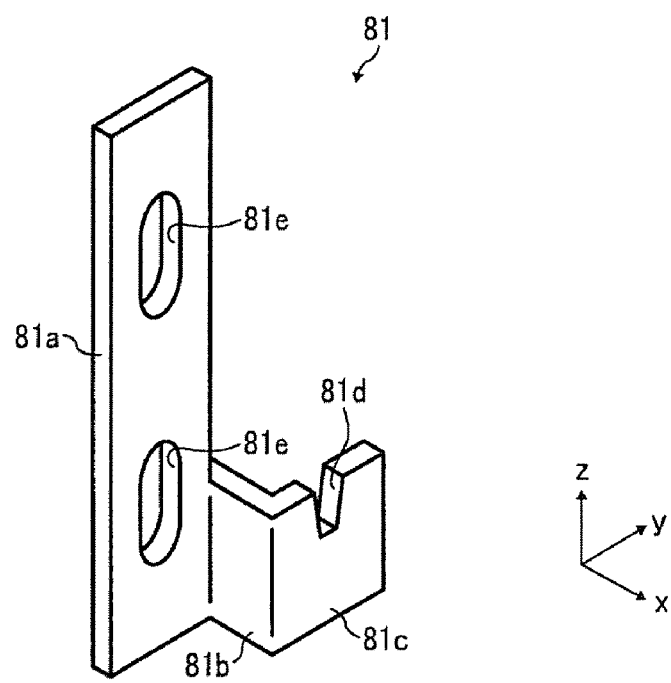
FIG. 11A is a perspective view of a holding member 81.
Figure 11B:
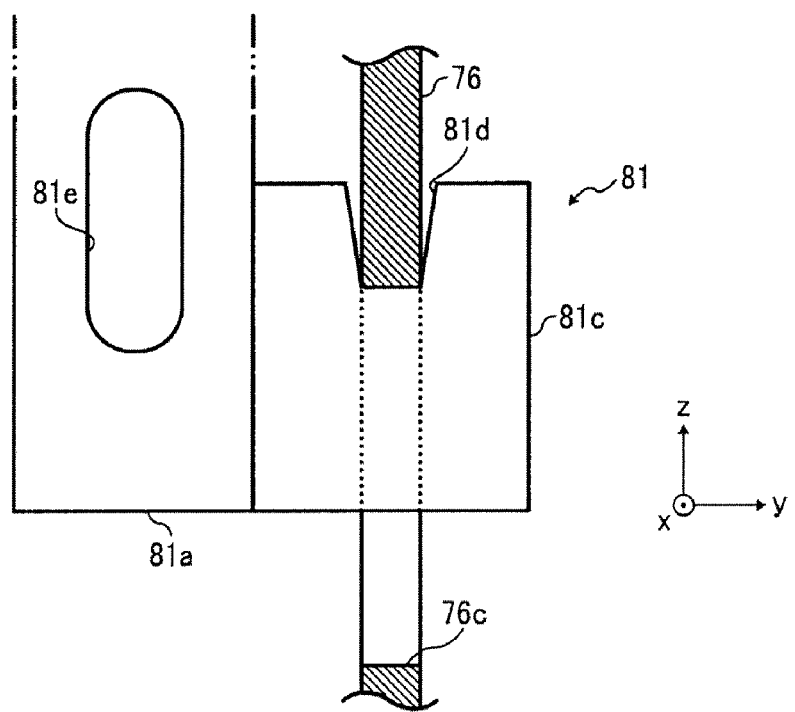
FIG. 11B is a partial side view thereof.

FIG. 11A perspectively shows the holding member 81 while FIG. 11B partially shows a side thereof. The holding member 81 is formed by press working or sheet metal processing on a metal plate. The holding member 81 is composed of three parts, a rectangular fixation portion 81a which is long in the z-axis direction, a plate-like latch portion 81c with a V-form notch (engaging portion) 81d from an upper end to the center, a connection portion 81b to connect the fixation portion 81a and the latch portion 81c when they are in parallel to each other, as shown in FIG. 11A. The fixation portion 81a has long holes 81e adjacent with each other and long in the z-axis direction. As shown in the exploded view in FIG. 11B, the notch 81d of the latch portion 81c is formed in such a shape that the two side lines get narrower in width in the y-axis direction as they go downwards (reverse z-axis direction). The width of the bottom thereof is set to be equal to or smaller than the thickness of the substrate 76.

Figure 12A:
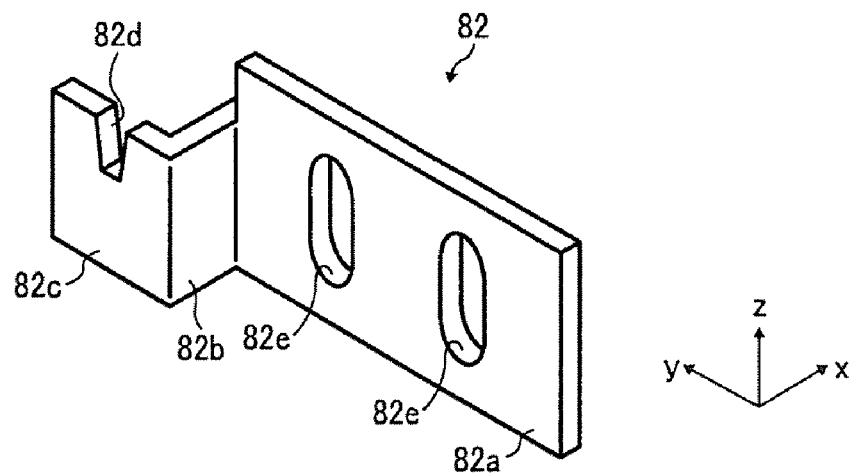
FIG. 12A is a perspective view of a holding member 82.
Figure 12B:
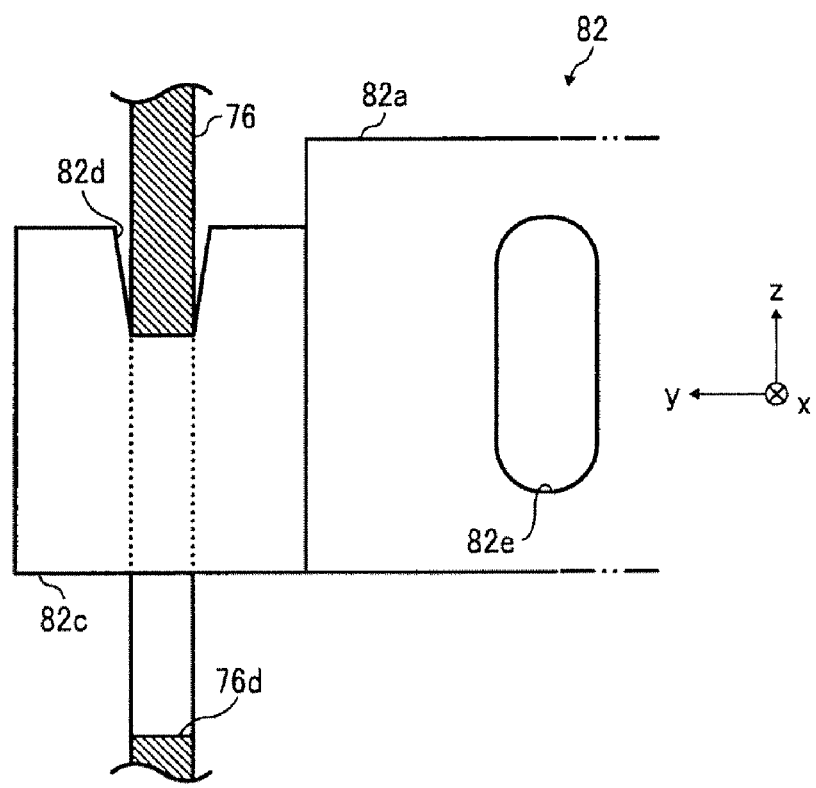
FIG. 12B is a partial side view thereof.

Similarly, FIG. 12A perspectively shows the holding member 82 while FIG. 12B partially shows a side thereof. The holding member 82 is formed by press working or sheet metal processing on a metal plate. The holding member 82 is composed of three parts, a fixation portion 82a which is long in the y-axis direction, a plate-like latch portion 82c with a notch (engaging portion) 82d from an upper end to the center, a connection portion 82b to connect the fixation portion 82a and the latch portion 82c when they are in parallel to each other, as shown in FIG. 12A. The fixation portion 82a has long holes 82e adjacent with each other in the y-axis direction and long in the z-axis direction. As shown in the exploded view in FIG. 12B, the notch 82d of the latch portion 82c is formed in such a shape that the two side lines get narrower in width in the y-axis direction as they go downwards (reverse z-axis direction). The width of the bottom thereof is equal to or smaller than the thickness of the substrate 76.

Figure 13:
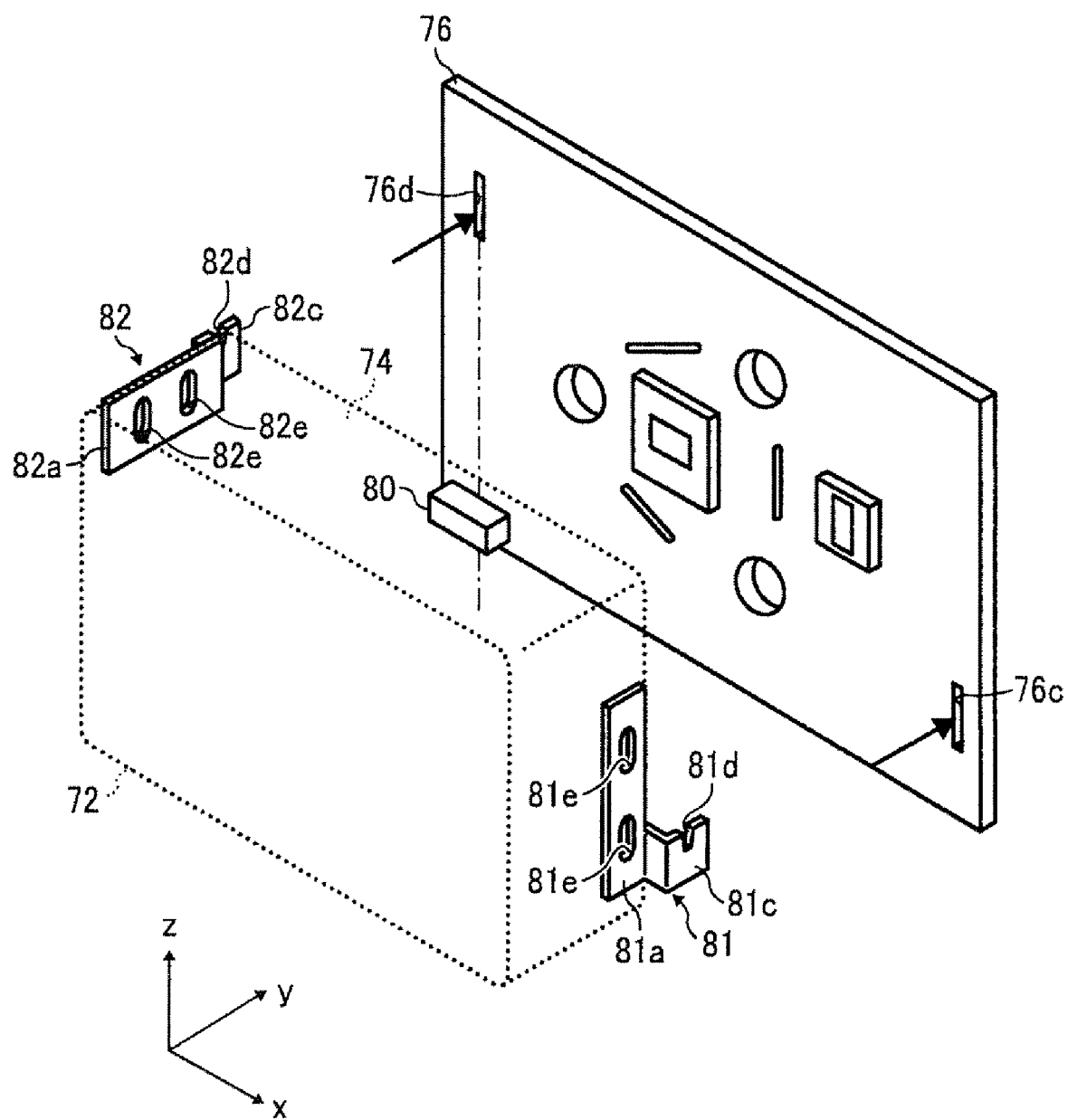
FIG. 13 shows a first example of how a first support portion 74 and a substrate 76 are joined.

Referring to FIGS. 10, 13, such a holding member 81 is fixed on the side surface (x-axis side) of the first support portion 74 with bolts 85 via the long holes 81e of the fixation portion 81a, with the latch portion 81c projected from the x-axis side of the first support portion 74. Likewise, the holding member 82 is fixed on the side surface (reverse x-axis side) of the first support portion 74 with not-shown bolts 85 via the long holes 82e of the fixation portion 82a, with the latch portion 82c projected from the y-axis side of the first support portion 74. The holding members 81, 82 are configured to be vertically movable by the bolts 85's sliding in the long holes 81e, 82e, respectively.

As shown in FIG. 13, the substrate 76 includes, at upper end of the reverse x-axis side and lower end of the x-axis side, holes 76c, 76d which are long in the z-axis direction. The first support portion 74 and the substrate 76 are fixed by fitting the light source 10 and the light receiving element 18 into the concavities 74b, 74c of the first support portion 74 (FIG. 6) and then joining the first support portion 74 and the substrate 76 with the latch portions 81c, 82c of the holding members 81, 82 inserted through the holes 76c, 76d, respectively.

Then, by moving the holding members 81, 82 upwards relative to the substrate 76 and the first support portion 74, as shown in FIGS. 11B, 12B, the notches 81d, 82d of the holding members 81, 82 are engaged with the holes 76c, 76d while the bottom portions of the holding members are in contact with the substrate 76. The holding members 81, 82 are firmly fixed to the first support portion 74 by fastening the bolts 85 fitted into the first support portion 74. In this manner the substrate 76 can be fixed on the first support portion 74 at the defined position in the y-axis direction.

Figure 14:
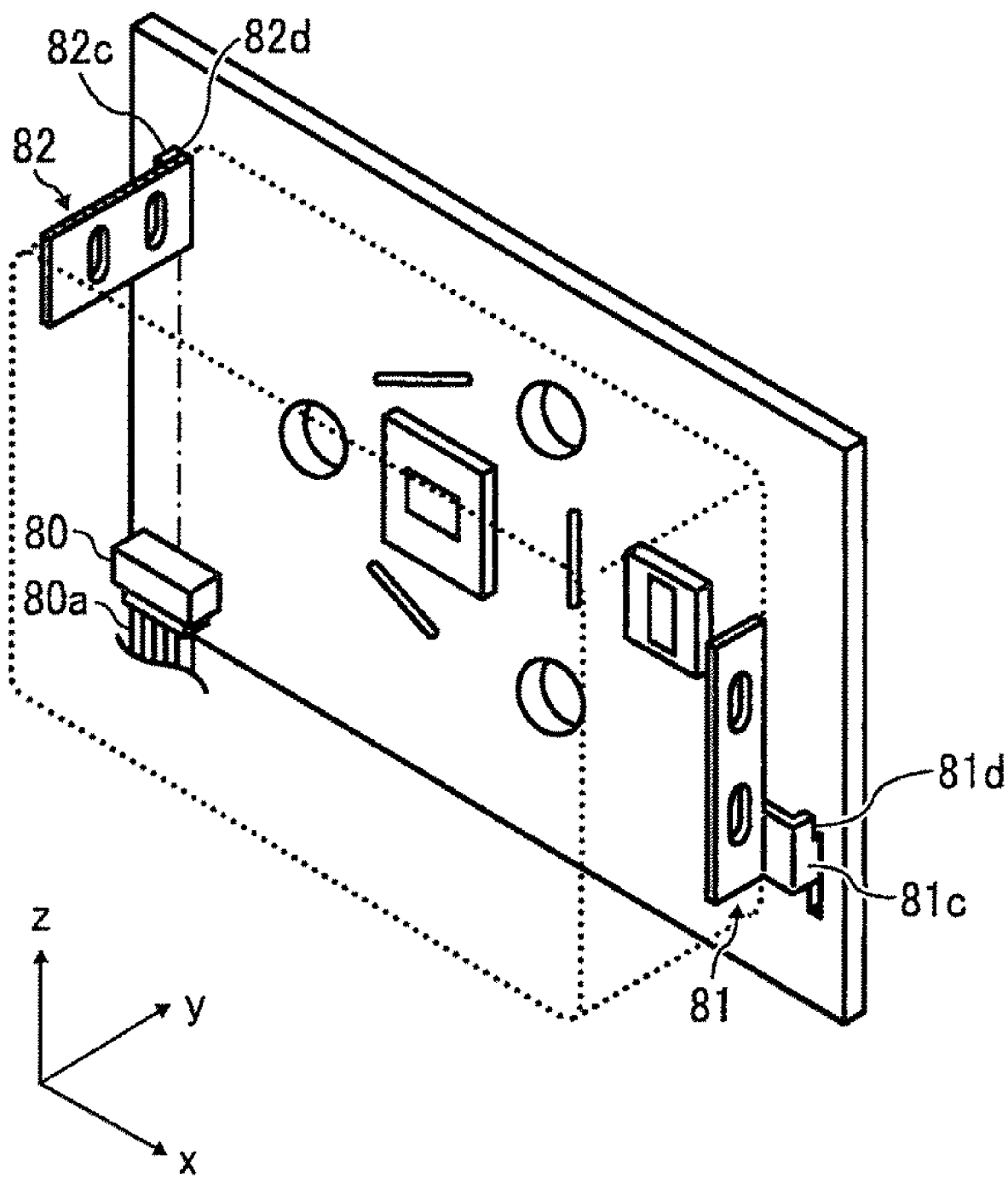
FIG. 14 shows a second example of how the first support portion 74 and the substrate 76 are joined.

Moreover, the light source unit 70' includes a connector 80 on the reverse y-axis side surface of the substrate 76, as shown in FIGS. 13, 14 for example. The connector is placed on a straight line on the hole 76d and in parallel to the z axis, to be connected with an external wiring 80a (FIG. 14) from below.

As described above, the light source unit 70' according to the present embodiment is configured to include the holding members 81, 82 so that the first support portion 74 and the substrate 76 can be fixed at the defined relative position by fixing the fixation portions 81a, 82a on the first support portion 74 while the notches 81d, 82d are engaged with the substrate 76. This allows the relative position between the first support portion 74 and the substrate 76 to be constantly maintained, resulting in constantly maintaining the relative position between the coupling element 11 on the second support portion 72 and the light source 10.

Further, disposing the connector 80 on the straight line on the hole 76d and in parallel with the z axis can effectively reduce a displacement in the positions of the substrate 76 and the first support portion 74 due to external force from connecting/disconnecting (putting in/pulling out) the external wiring 80a to/from the connector 80. In general, detachment of the external wiring 80a is likely to be done carelessly. Aiming for preventing this from happening, the holding members 81, 82 according to the present embodiment are configured to support the substrate 76 from below by the notches 81d, 82d.

In the present embodiment, the notches 81d, 82d are formed in such a shape that the two side lines get narrower in width in the y-axis direction as they go downwards (reverse z-axis direction). The width of the bottom thereof is set to be equal to or smaller than the thickness of the substrate 76. This can especially achieve more precise positioning of the substrate 76 in the y-axis direction. However, without assembling easiness taken into consideration, the notch 81d can be shaped such that the width of the two side lines in the y-axis direction is equal to the thickness of the substrate 76 at any point. Further, the width thereof in the y-axis direction need not be equal to or smaller than the thickness of the substrate in order to avoid the positional shift of the first support portion 74 and the substrate 76 due to external force from the z-axis direction alone.

When the external wiring is attached/detached to/from the connector 80 on the substrate 76 in the y-axis direction, the connector 80 is preferably disposed close to the holding members. For the attachment/detachment in the other directions, optimally adjusting the position and direction of the holding members makes it possible to constantly maintain the relative position of the first support portion 74 and the substrate 76.

According to the present embodiment, the respective portions of the holding members 81, 82 are shaped with precision by press working or sheet metal processing. Accordingly, the engaging portions can be engaged with the substrate 76 firmly.

The present embodiment has described an example where the notches 81d, 82d of the holding members 81, 82 are engaged with the holes 76c, 76d. However, the present invention is not limited thereto. The holding members 81, 82 can be configured to be engaged with the outer edge portion of the substrate 76, or notches formed on the outer edge portion.

Also, the present embodiment has described an example where the relative position of the first support portion 74 and the substrate 76 are fixed by the two holding members 81, 82. However, the number of holding members can be three or more, or only one, for example, the holding member 82 only. In this case, it is also possible to reduce moment around the y axis on the substrate 76 due to the external force from the detachment/attachment of the external wiring 80a from/to the connector 80.

In the first embodiment, the holding members are placed at the fixed positions on the first support portion 74 while in the second embodiment, they are movable in the z-axis direction. Alternatively, the holding members may be movable in the y-axis direction relative to the first support portion 74.

Figure 15:
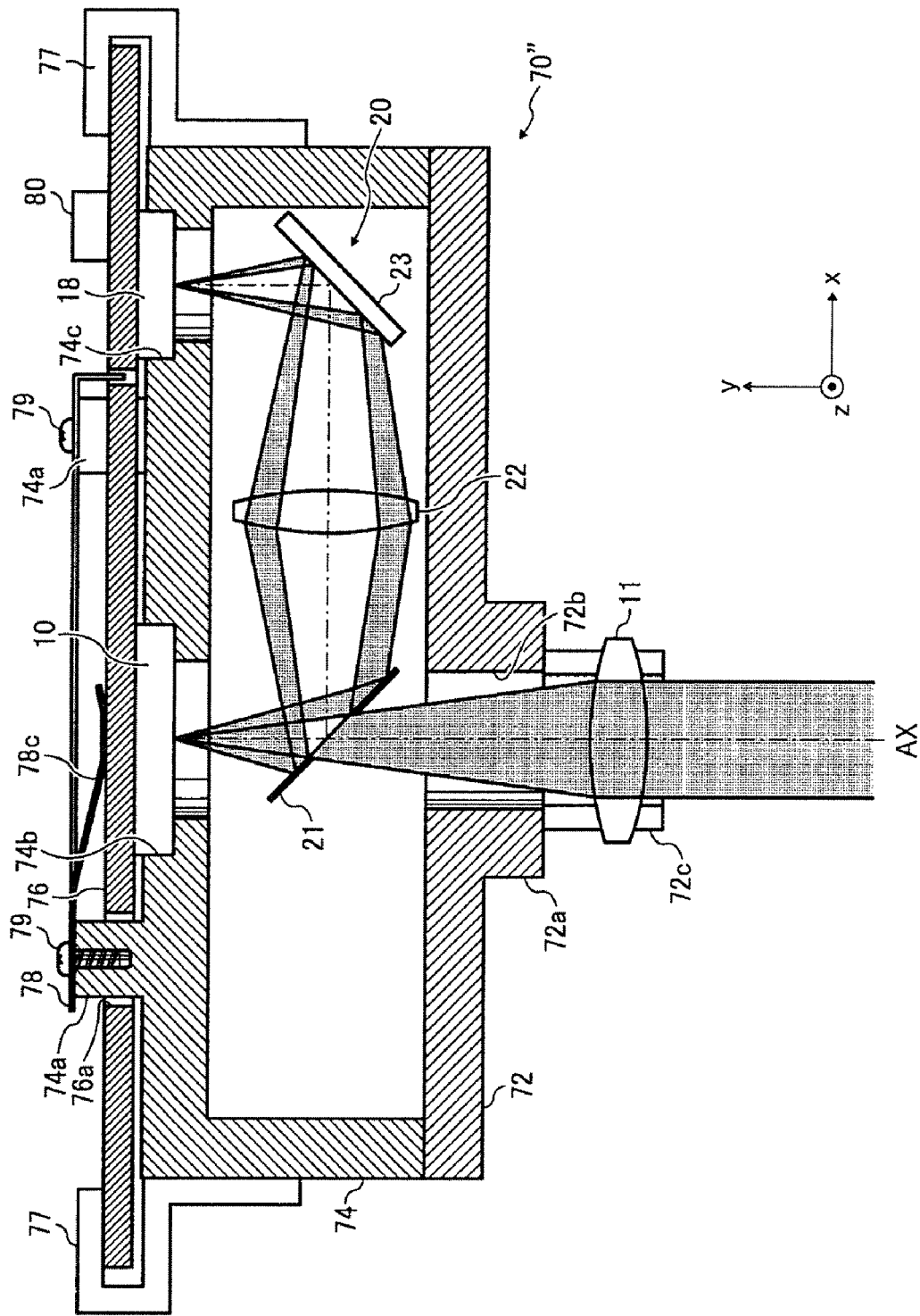
FIG. 15 is a first x to y cross sectional view of a modified example, a light source unit 70"
Figure 16:
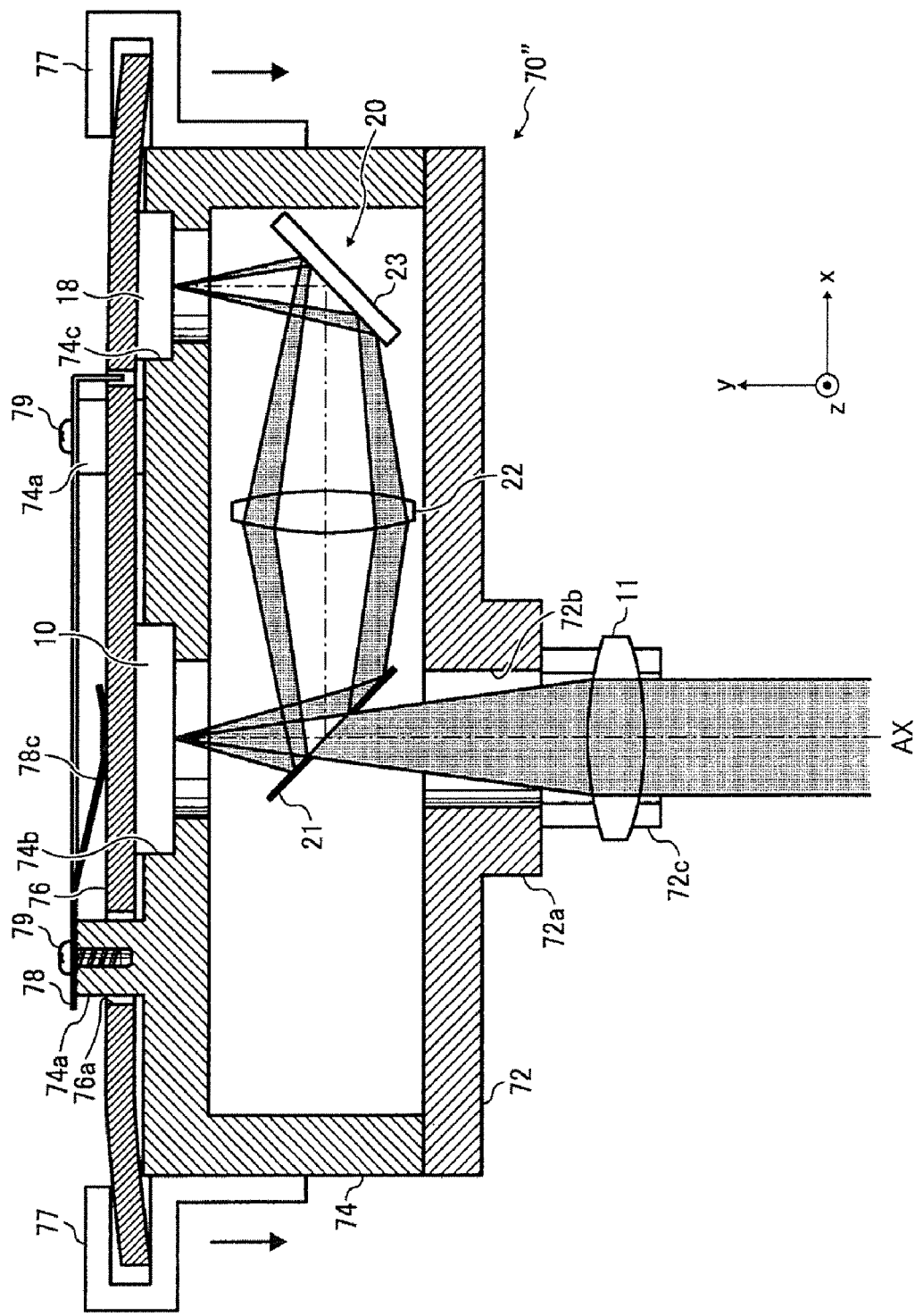
FIG. 16 is a second x to y cross sectional view of the light source unit 70".

In such a case, as shown in a light source unit 70" in FIG. 15, the first support portion 74 and the substrate 76 are joined with each other while a pair of holding members 77 are fitted into two outer ends of the substrate 76. Then, in FIG. 16, by relatively moving the holding members to the first support portion 74 in the reverse y-axis direction, the substrate 76 is bent to generate elastic force on the light source 10 in the reverse y-axis direction. This can firmly bring the reverse y-axis side surface of the light source 10 in contact with the bottom wall of the concavity 74b on the first support portion 74 by pressure.

The first and second embodiments have described the multi-color image formation apparatus 500 with the plurality of photoconductive drums 30A to 30D. However, the present invention is not limited thereto. The present invention is applicable to a mono-color image formation apparatus which scans a single photoconductive drum with a plurality of light beams.

Further, the first and second embodiments have described an example where the optical scan apparatus 100 is applied to a printer. However, the present invention is not limited thereto. The optical scan apparatus 100 is suitable for other image formation apparatuses besides a printer, such as a photocopier, a facsimile machine, or the combination of such devices.

As exemplified above, the light source unit according to the present invention is configured to accurately position the light source relative to the first support portion. Also, after the relative position is defined by the bias member, the substrate and the first support portion are fixed by the holding member. Accordingly, the relative position between the substrate and the first support portion can be constantly maintained, so that consequently, the positional relation between the coupling element supported by the second support portion and the light source can be constantly maintained.

Further, the light source unit according to the present invention is configured to include the bias member with the anchor portion. Therefore, it is possible to prevent a change in the relative position between the bias member and the substrate.

Further, the light source unit according to the present invention is configured to include the holding member movable in the optical axis of the coupling element. Accordingly, by bowing the substrate, elastic force to the coupling element acts on the light source. Thereby, it is made possible to firmly bring the surface of the light source on the coupling element side into the bottom wall of the concavity by pressure.

Further, according to the present invention, it is possible to prevent a change in the relative position between the substrate and the first support portion when attaching/detaching the wiring to/from the connector or when in handling the light source for maintenance purpose, the substrate is accidentally made in contact with another component, for example.

Further, the optical scan apparatus according to the present invention is configured to include the above-described light source unit so that it can scan the scan surfaces of the photoconductive drums stably and accurately without variation in the imaging characteristics of the light beams over time.

Further, in the optical scan apparatus according to the present invention, the light source unit is configured to be rotatably supported around the optical axis. Therefore, rotating the light source unit relative to the optical elements after the aperture member makes it possible to adjust the light beams to be focused on the photoconductive drums with a predetermined pitch in the sub scan direction.

Further, the image formation apparatus according to the present invention is configured to include the above-described optical scan apparatus so that it can form accurate images on the recording medium stably.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A light source unit comprising:
    a light source with a plurality of light emission portions two-dimensionally arranged;
    a substrate on which the light source is mounted;
    a first support portion supporting the substrate;
    a bias member biasing the substrate towards the first support portion and comprising an anchor portion which latches the substrate to restrict movement thereof in a direction orthogonal to an optical axis of the light source;
    a coupling element coupling a light beam emitted from the light source;
    a second support portion supporting the coupling element; and
    a holding member holding a position of the substrate relative to the first support portion.

2. A light source unit according to claim 1, wherein:
    the light source comprises a light emitting element including a plurality of light emission portions and a package containing the light emitting element; and
    in order to position the light source relative to the first support portion, the bias member biases the substrate towards the first support portion to make the package in contact with the first support portion.

3. A light source unit according to claim 1, wherein
    the holding member is attached to the first support portion and is movable in an optical axis direction of the coupling element.

4. A light source unit according to claim 1, comprising a plurality of holding members holding a position of the substrate relative to the first support portion.

5. A light source unit according to claim 1, further comprising
    a connector mounted on the substrate and connected with a wiring from outside, wherein
    the holding member holds neighborhood of a portion of the substrate on which the connector is mounted.

6. A light source unit according to claim 5, wherein
    the holding member is disposed on a line in parallel to a direction from which the connector is connected or disconnected with the wiring.

7. An optical scan apparatus scanning a scan surface with a light beam, comprising:
    a light source unit according to claim 1;
    an optical deflector deflecting a light beam emitted from the light source unit;
    an optical imaging system focusing the light beam deflected by the optical deflector on the scan surface.

8. An optical scan apparatus according to claim 7, wherein
    the light source unit is rotatably supported around the optical axis of the coupling element.

9. An image formation apparatus which forms a toner image according to an electrostatic latent image obtained by image information, and fuses the toner image on a recording medium for image formation, comprising:
    an optical scan apparatus according to claim 8;
    a photoconductive drum on which an electronic latent image is formed by the optical scan apparatus;
    a develop unit visualizing the electrostatic latent image formed on the photoconductive drum; and
    a transfer unit fusing a toner image visualized by the develop unit on a recording medium.

10. A light source unit comprising:
    a light source with a plurality of light emission portions two-dimensionally arranged;
    a substrate on which the light source is mounted;
    a first support portion supporting the substrates;
    a bias member biasing the substrate towards the first support portion;
    a coupling element coupling a light beam emitted from the light source;
    a second support portion supporting the coupling element; and
    a holding member holding a position of the substrate relative to the first support portion being attached to the first support portion and comprising an engaging portion which is engaged with the substrate.

11. A light source unit according to claim 10, wherein
    the holding member holds the substrate in a direction orthogonal to an optical axis of the coupling element.

12. A light source unit according to claim 11, wherein
    the engaging portion is formed in one of wedge and trapezoid shapes.

13. An optical scan apparatus scanning a scan surface with a light beam, comprising:
    a light source unit according to claim 10;
    an optical deflector deflecting a light beam emitted from the light source unit;
    an optical imaging system focusing the light beam deflected by the optical deflector on the scan surface.

14. An optical scan apparatus according to claim 13, wherein
    the light source unit is rotatably supported around the optical axis of the coupling element.

15. An image formation apparatus which forms a toner image according to an electrostatic latent image obtained by image information, and fuses the toner image on a recording medium for image formation, comprising:
    an optical scan apparatus according to claim 14;
    a photoconductive drum on which an electronic latent image is formed by the optical scan apparatus;
    a develop unit visualizing the electrostatic latent image formed on the photoconductive drum; and
    a transfer unit fusing a toner image visualized by the develop unit on a recording medium.

16. A light source unit comprising:
    a light source with a plurality of light emission portions two-dimensionally arranged;
    a substrate on which the light source is mounted;
    a coupling element coupling a light beam emitted from the light source;
    a support portion supporting the substrate and supporting the coupling element;
    a bias member biasing the substrate towards the support portion and comprising an anchor portion which latches the substrate to restrict movement thereof in a direction orthogonal to an optical axis of the light source; and
    a holding member holding a position of the substrate relative to the support portion.

17. An optical scan apparatus scanning a scan surface with a light beam, comprising:
    a light source unit according to claim 16;
    an optical deflector deflecting a light beam emitted from the light source unit;
    an optical imaging system focusing the light beam deflected by the optical deflector on the scan surface.

18. A light source unit comprising:
a light source with a plurality of light emission portions two-dimensionally arranged;
a substrate on which the light source is mounted;
a coupling element coupling a light beam emitted from the light source;
a support portion supporting the substrate and supporting the coupling element;
a bias member biasing the substrate towards the support portion; and
a holding member holding a position of the substrate relative to the support portion, being attached to the support portion and comprising an engaging portion which is engaged with the substrate.

19. An optical scan apparatus scanning a scan surface with a light beam, comprising:
a light source unit according to claim 18;
an optical deflector deflecting a light beam emitted from the light source unit;
an optical imaging system focusing the light beam deflected by the optical deflector on the scan surface.

* * * * *